United States Patent [19]

Saito

[11] Patent Number: 5,212,779
[45] Date of Patent: May 18, 1993

[54] SYSTEM FOR GUARANTEE REEXECUTION AFTER INTERRUPTION BY CONDITIONALLY USED STORE BUFFER IF MICROINSTRUCTION BEING EXECUTED IS A MEMORY WRITE AND LAST MICROINSTRUCTION

[75] Inventor: Yuuichi Saito, Itami, Japan

[73] Assignee: Mitsubishi Denki Kabushiki Kaisha, Tokyo, Japan

[21] Appl. No.: 574,845

[22] Filed: Aug. 29, 1990

[30] Foreign Application Priority Data

Aug. 29, 1989 [JP] Japan .................. 1-222207

[51] Int. Cl.$^5$ ............... G06F 9/22; G06F 9/06
[52] U.S. Cl. .................... 395/375; 395/425; 395/800; 364/231.8; 364/948.34; 364/DIG. 1
[58] Field of Search ............ 395/325, 375, 775, 200, 395/250, 800, 425

[56] References Cited

U.S. PATENT DOCUMENTS

| | | | |
|---|---|---|---|
| 4,635,194 | 1/1987 | Burger et al. | 395/375 |
| 4,648,034 | 3/1987 | Heniger | 395/325 |
| 4,777,594 | 10/1988 | Jones et al. | 364/200 |
| 4,858,105 | 8/1989 | Kuriyama et al. | 395/375 |
| 5,043,868 | 8/1991 | Kitamura et al. | 395/775 |
| 5,067,069 | 11/1991 | Fite et al. | 395/375 |
| 5,084,837 | 1/1992 | Matsumoto et al. | 395/250 |

OTHER PUBLICATIONS

Proc. of ICCD 1987, pp. 168-172.

*Primary Examiner*—Thomas C. Lee
*Assistant Examiner*—Meng-Ai T. An
*Attorney, Agent, or Firm*—Townsend and Townsend

[57] ABSTRACT

A data processor which is constructed such that, when writing processing of an operand to external devices is included as the last step processing of a microprogram, by moving only the writing processing to a next pipeline stage, all of external access processings during execution of the microinstruction in the other plural steps are executed in an instruction execution stage, thereby information showing the internal states such as PSW, PC, and the like can be managed in the instruction execution stage alone to facilitate exceptional processing.

3 Claims, 20 Drawing Sheets

| CLASSIFICATION OF EIT | CONTEXT | PC AT REEXECUTING | TYPE OF EIT |
|---|---|---|---|
| EXCEPTION | RELATING | PRESENT INSTRUCTION | PROCESSING CANCELED TYPE |
| INTERRUPT | NO RELATING | NEXT INSTRUCTION | PROCESSING COMPLETED TYPE |
| TRAP | RELATING | NEXT INSTRUCTION | PROCESSING COMPLETED TYPE |

Fig. 13

| PSW | | | |
|---|---|---|---|
| Format | Type | 0000000 | Vector |
| NEXTPC | | | |
| OTHER INFORMATION | | | |

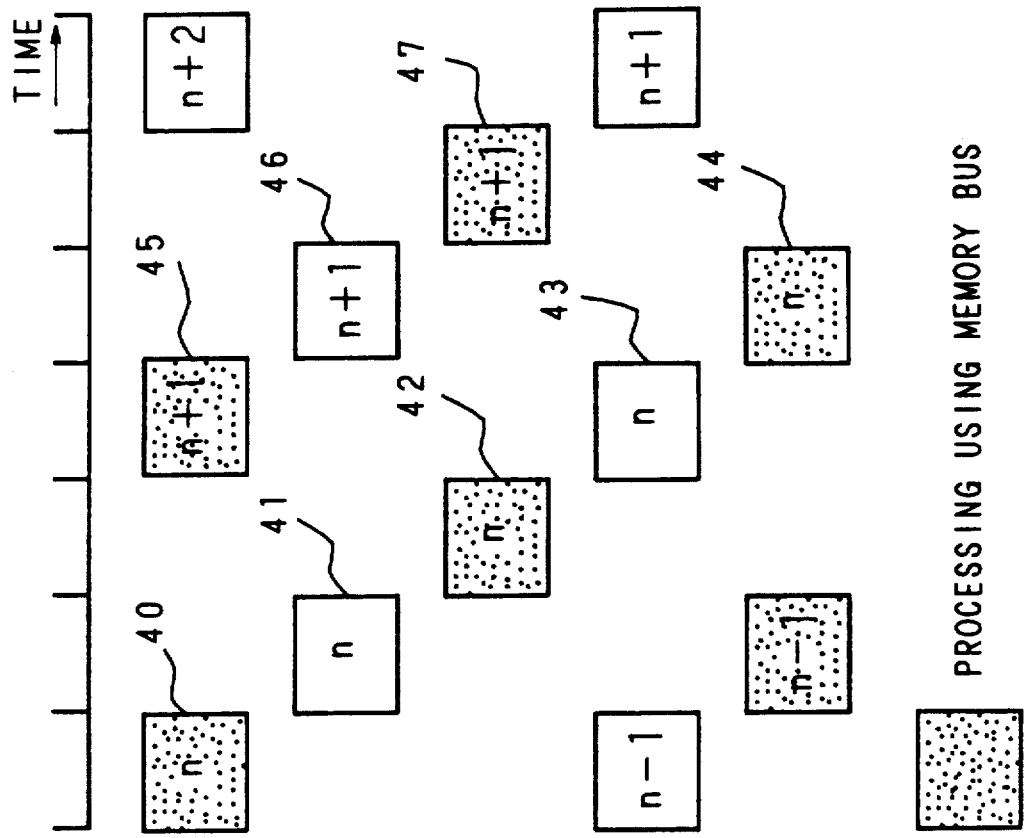
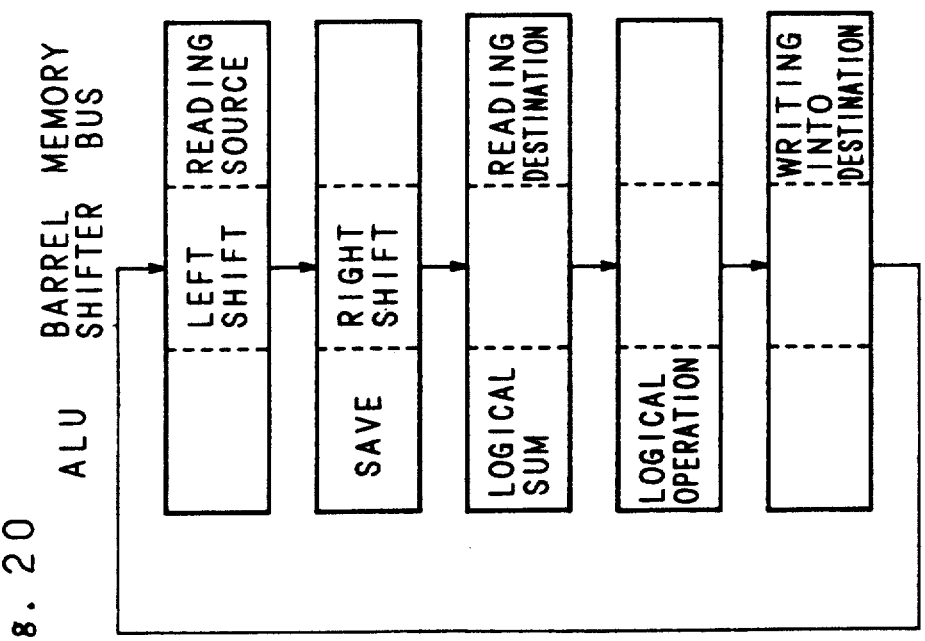
Fig. 20

SYSTEM FOR GUARANTEE REEXECUTION AFTER INTERRUPTION BY CONDITIONALLY USED STORE BUFFER IF MICROINSTRUCTION BEING EXECUTED IS A MEMORY WRITE AND LAST MICROINSTRUCTION

BACKGROUND OF THE INVENTION

1. Field of the Invention

The present invention relates to a data processor having a pipeline processing mechanism, more particularly, it relates to the data processor such as a microprocessor including high function instructions or high function exceptional processing and interrupt processing mechanisms.

2. Description of Related Art

As a result of development of large-scale LSIs with the advance of semiconductor manufacturing techniques, also in a microprocessor, a high function instruction executing plural instructions which are prepared in firmwares is included to reduce a burden on the side of softwares and to improve the processing performances.

Since such a high function instruction necessitates complicated processings in the microprocessor, as a method of processing efficiently in the Neuman type microprocessor considering the load of the hardwares, it is efficacious to divide the high function instruction into plural processing and execute in a microprogram control mode.

Also, generally, in the data processor such as the microprocessor, the performance is improved by effecting pipeline processings and processing the plural instructions in parallel in the internal pipeline stages. The pipeline processing is advantageous in that the instructions can be apparently processed in parallel for improvement of the processing performance, since processings are divided and executed respectively in each stage. However, when loads for processings of each of the pipeline stages are not uniform, a total processing speed is restricted by the processing speed in the pipeline stage where the load is large, thus the performance can not be improved.

Accordingly, when designing the pipeline configuration, it must be taken into account that the loads for processings in each pipeline stage become uniform in response to the contents of various instructions processed by the microprocessor.

Usually, when designing the pipeline configuration of the microprocessor, a portion causing the processing speed trouble is a processing of transferring data between an external memory using an external bus. In the conventional microprocessor, by the reason that the time required for reading the data from the external bus and for writing the data into the external bus is longer as compared with the internal processing speed, the pipeline stage is provided each for these processings.

For example, in U.S. Pat. No. 4,648,034 "Busy Signal Interface between Master and Slave Processors in a Computer System". A. G. Heinger et al, the pipeline configuration of the conventional data processor is disclosed.

The conventional data processor is constituted by 6 pipeline stages, an instruction fetch stage, an instruction decoding stage, an address calculation stage, an operand fetch stage, an instruction execution stage and an operand store stage.

FIG. 1(a) to FIG. 1(e) show a flow chart of the pipeline processings of the above-mentioned conventional data processor.

The 3 pipeline stages of the instruction fetch stage, operand fetch stage and operand store stage are for executing the external bus access, and as previously described, usually in a high speed microprocessor, the delay time required for processing using the external bus is more problematic for the data processing speed than the delay time required for the internal signal processing. Therefore, the next instruction or the microinstruction is processed while the processing is executed using the external bus to reduce the comprehensive delay time.

After completing processings, 276, 277, 279 and 281 in the instruction execution stage, the processing moves to processings 283, 285, 287, 289, 291, 293 and 295 in operand store stage, wherein it is judged whether resulting operand data is written by the processing 285. When the operand data is not written, the processing in the stage is finished immediately. That is, in every cases, instructions are processed via the operand store stage.

In processings of 211, 235, 239, 269 and 281, it is judged and processed so as to proceed to the next pipeline stage after confirming that processings between respective stages have been completed.

In the Technical Report ICD87-176 "Study on CPU Architecture of a 32-bit Microprocessor TX3 based upon TRON Specifications" by Miyamori et al, Integrated Circuit Study Group, Electronic Information & Communication Society, a pipeline configuration of the microprocessor called TX3 is described.

Basically, the microprocessor TX3 comprises the seven pipeline stages of an instruction fetch stage, an instruction decoding stage, an effective address calculation stage, an address translation stage, an operand fetch stage, an instruction execution stage and an operand store stage. In the multi-stage pipeline configuration, the pipeline processings proper are processed in parallel, specifically, executing the pipeline stage of the instruction execution stage next to the instruction decoding stage to attain improvement of the performance of the microprocessor.

FIG. 2 is a schematic view showing the pipeline configuration.

As same as the example shown in FIG. 1, one pipeline stage is allocated to the processings in the operand fetch stage 302 and the operand store stage 305 to reduce a delay caused by the external bus access at processing the instructions. Also in this example, one pipeline stage is allocated to the operand store, so that for writing processing during the instruction processing, processing is always shifted to the next stage.

Furthermore, in "Architecture of the NS32532 Microprocessor" by D. Alpert et al, proc. of ICCD 1987, pp. 168 through 172, a pipeline configuration of the microprocessor called NS32532 is described. Here, the pipeline configuration constituted by four stages, 310, 312, 314 and 315, is disclosed.

FIG. 3 is a schematic view showing the pipeline configuration of the microprocessor NS32532.

In the figure, though the operand fetch is executed together with the address calculation in the same address calculation stage 314 (3rd Stage), and the operand store together with the instruction execution in the same instruction execution stage 315 (4th Stage), a 2-word buffer 316 is provided for the operand store processing.

That is, since the writing processing is shifted to the buffer 316 for execution, the next processing can be started in the instruction execution stage. Accordingly, in this case, though there are four pipeline stages, more instructions can be processed simultaneously.

From the examples aforementioned conventionally, when the external bus access is made unconditionally respectively for the operand fetch or operand store, one pipeline stage is allocated to improve the performance of the pipeline processings. In this case, external bus access processing itself is allocated as one pipeline stage, so that when the operand fetch or operand store processing is executed, these processings were always shifted to the separate pipeline stage.

When one instruction is completed for the one microinstruction, it is not difficult to control even by the processing method described above. However, in the microprocessor including multiplex high function instructions, when plural microinstruction steps are required for one instruction, the same instruction processing may sometimes be executed simultaneously in the instruction execution and the operand fetch and operand store pipeline stages. At that time, when exception, interrupt or trap (hereinafter generally referred to as an EIT) have occurred, it was complicated to control.

From such a point of view, for example, in "IMPLEMENTATION of PRECISE INTERRUPTS in PIPELINE PROCESSORS" by J. E. Smith and A. R. Pleszkun, proc. of 7th Annual International Symposium of Computer Architecture", June, 1985, pp.36–44, though difficulty of preserving the internal states for interrupt in a computer having a high grade pipeline structure is stated and a general method thereof is explained, basically, it admits necessity of a buffer for preserving the internal states. Accordingly, the more the EIT processing becomes complicated, the larger becomes an issue of processing the single instruction across the plural pipeline stages on the pipeline mechanism, to realize by the hardwares the processing for preserving the internal states at occurrence of the EIT.

In recent years, many microprocessors which execute the high grade and complicated EIT processings are developed. In such microprocessor, since the multiplex high function instructions are included, the multistage pipeline configuration of more than 5 or 6 stages is employed for speeding up these instruction processings. In such a case, because of the fact that the external bus access time of the microprocessor is slower as compared with the internal processing time, in many cases, the operand fetch and store are allocated as one pipeline stage. When the high function instruction is executed in the microprocessor, it is executed in plural microinstruction steps, so that one instruction is processed across several pipeline stages, but when the EIT occurs in this case as aforementioned, a number of hardwares are necessitated for preserving the internal states.

SUMMARY OF THE INVENTION

The present invention has been devised to solve such problems, particularly, in pipeline processings related to the operand store, and it is directed to insure the preserving function of the internal states for the EIT processings with a simple control method.

A data processor of the present invention is so constructed that, only when the last step of the microprogram includes operand store processing, only the store processing is operated in the next pipeline stage.

In the data processor of the present invention, as only when the last step of the microprogram includes operand store processing, the processing for store operand is operated in the next pipeline stage, all other external bus access processings during execution of the microinstruction in plural steps are controlled so as to be executed in the instruction execution stage. Thereby, management of information showing the internal stages such as a PSW (processor status word) or a PC (program counter) may also be executed in the instruction execution stage alone, so that such information can be managed by the microprogram.

In the data processor of the present invention, though deterioration of the processing speed of the microprocessor is a question, in the high function instruction dealing with string information and repeating the external bus access during execution of plural microinstructions, the microinstruction can be programmed so as to minimize the delay in processing sequence of the external bus access by the microinstruction, and also the similar counter measures can be taken for the other high function instructions, thus deterioration of the performance is prevented.

The above and further objects and features of the invention will more fully be apparent from the following detailed description with accompanying drawings.

BRIEF DESCRIPTION OF THE DRAWINGS

FIG. 13 is a schematic view showing a configuration of a stack for saving information necessary for EIT processings following the EIT detection, FIG. 20 is a timing chart showing the processing states of the BVMAP instruction.

DESCRIPTION OF THE PREFERRED EMBODIMENTS

Hereinafter, detailed description of the present invention is provided based on drawings showing one embodiment thereof.

In addition, in this embodiment, 32-bit microprocessor is used as a CPU.

(1) "Configuration of Function Block"

Figure 1A:
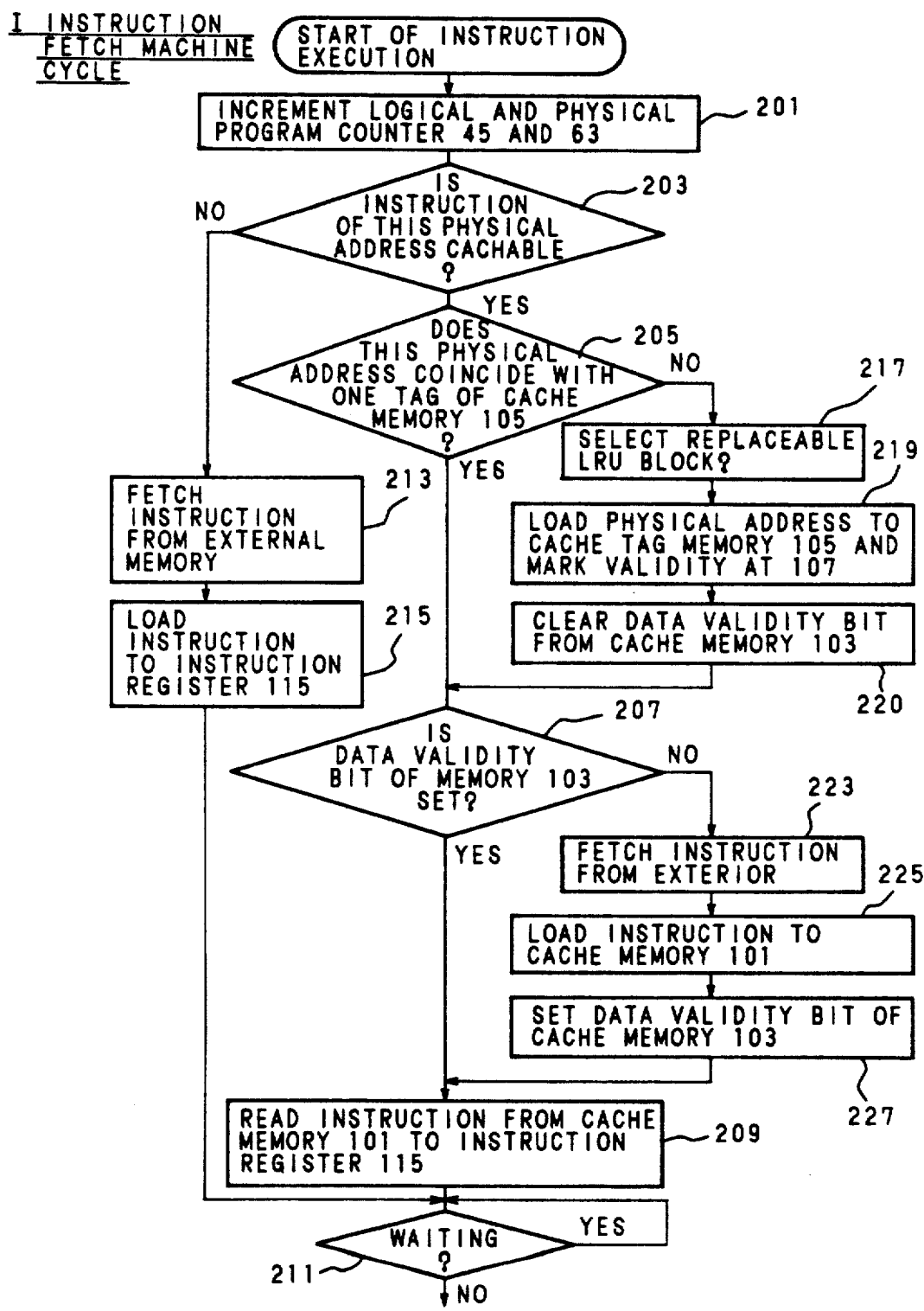
FIGS. 1(a) through FIG. 1(e) is a flow chart showing a flow of a pipeline processings of a conventional microprocessor.
Figure 1B:
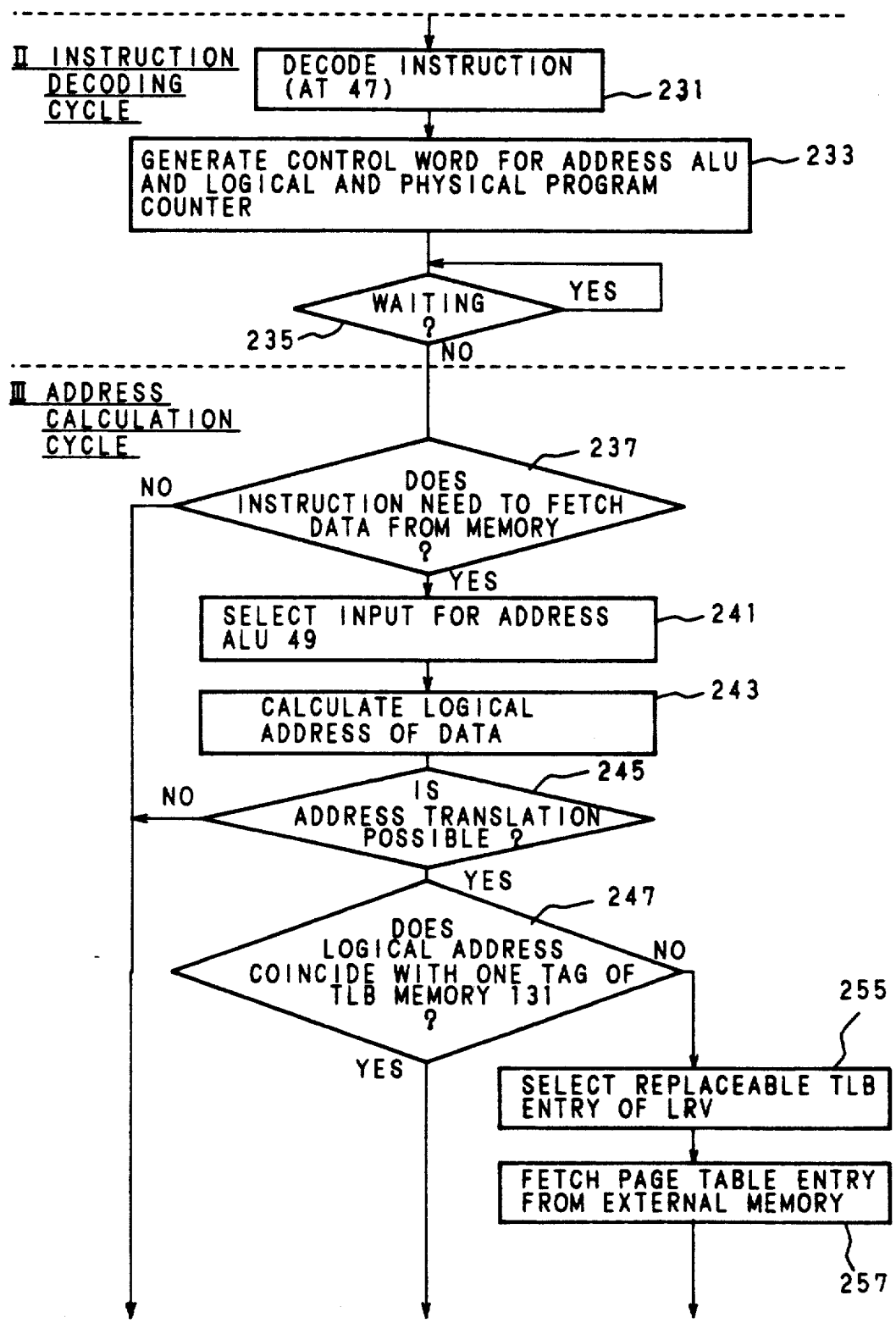
Figure 1C:
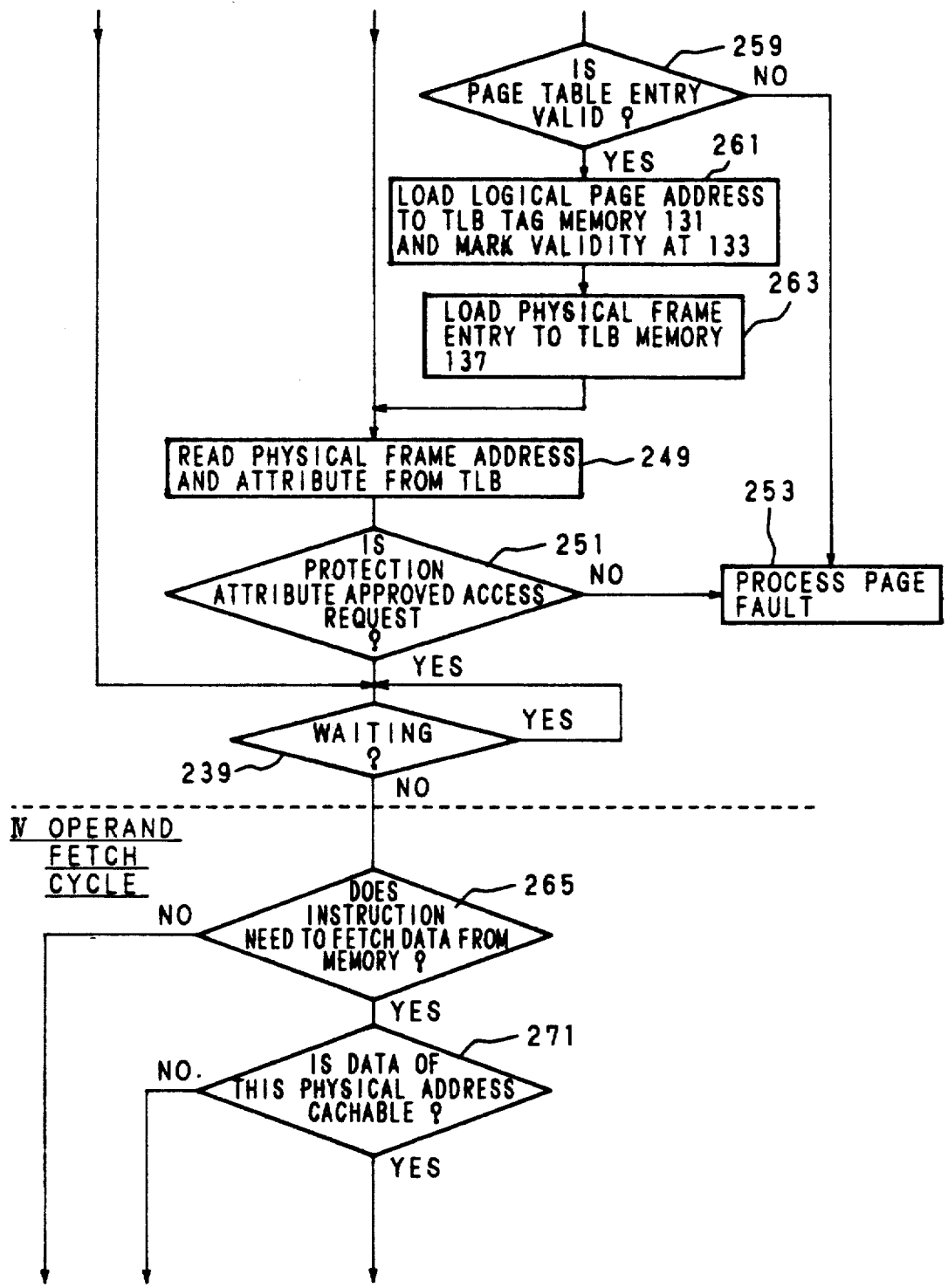
Figure 1D:
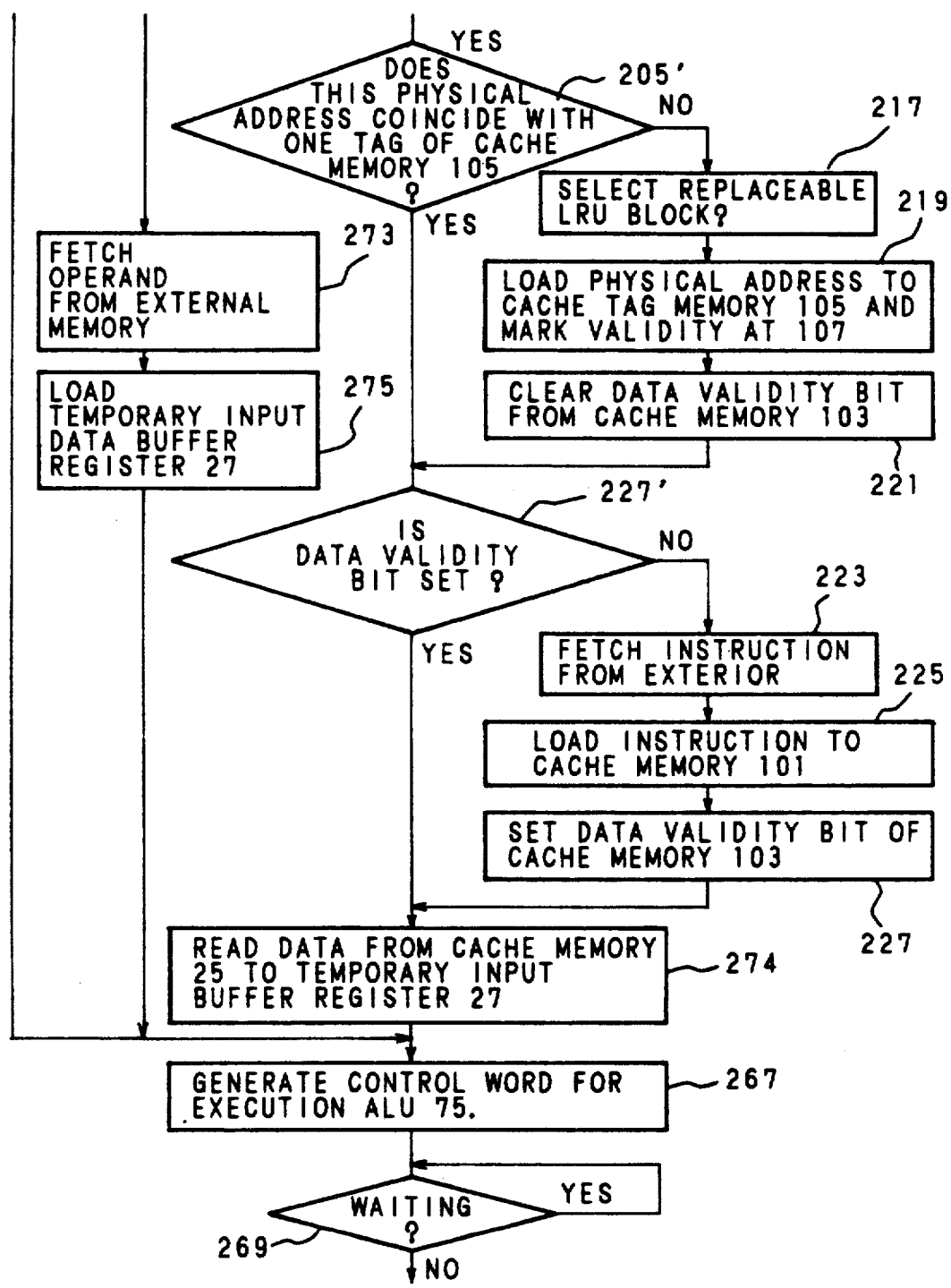
Figure 1E:
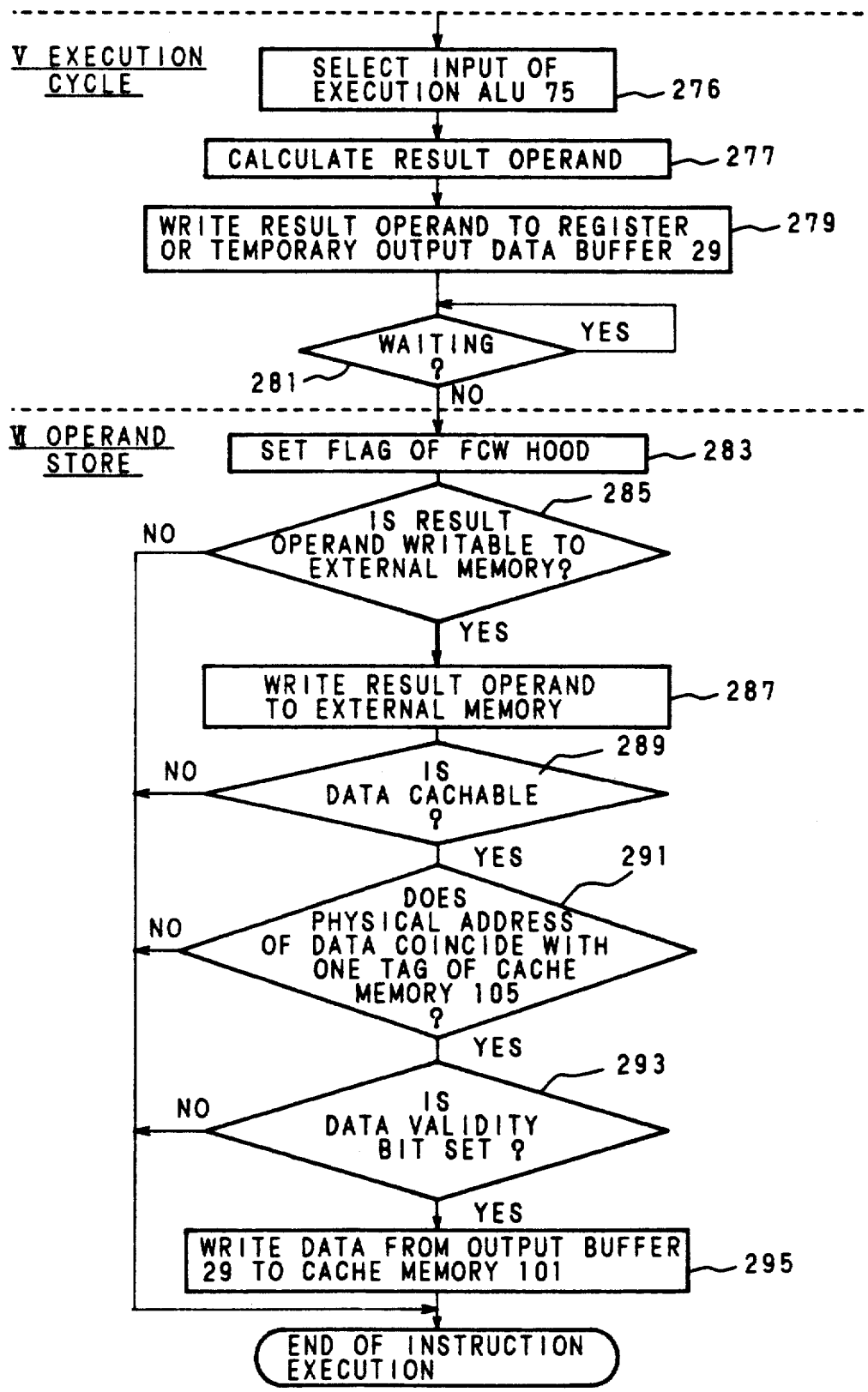
Figure 2:
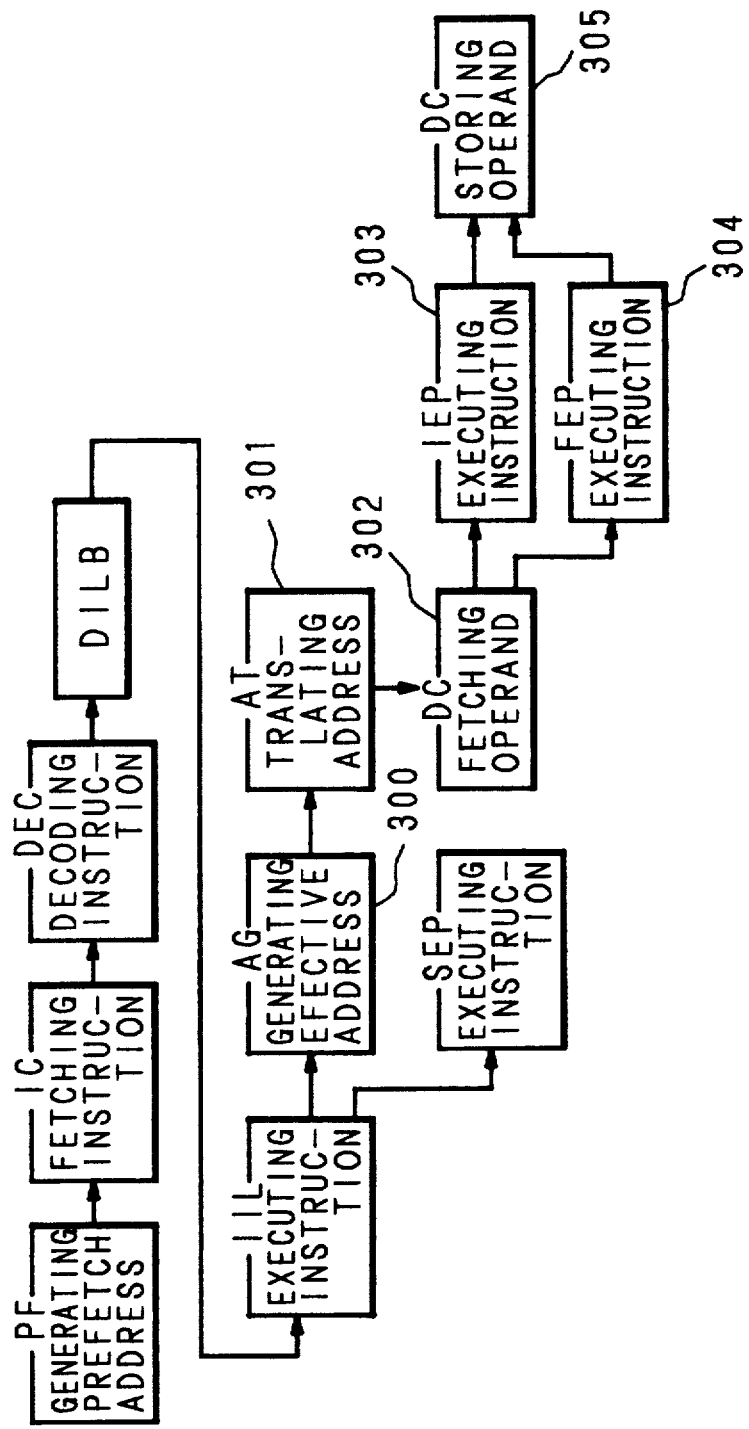
FIG. 2 and FIG. 3 are both schematic views showing configurations of the pipeline processing mechanisms of the conventional microprocessor.
Figure 3:
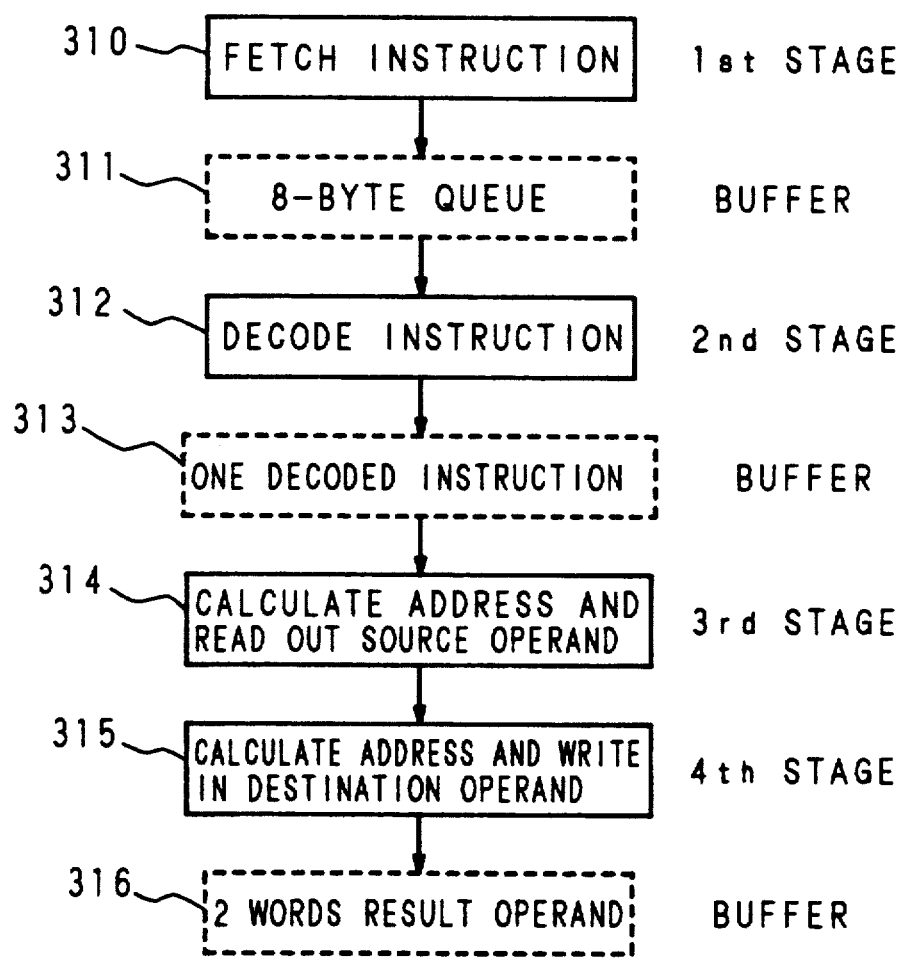
Figure 4:
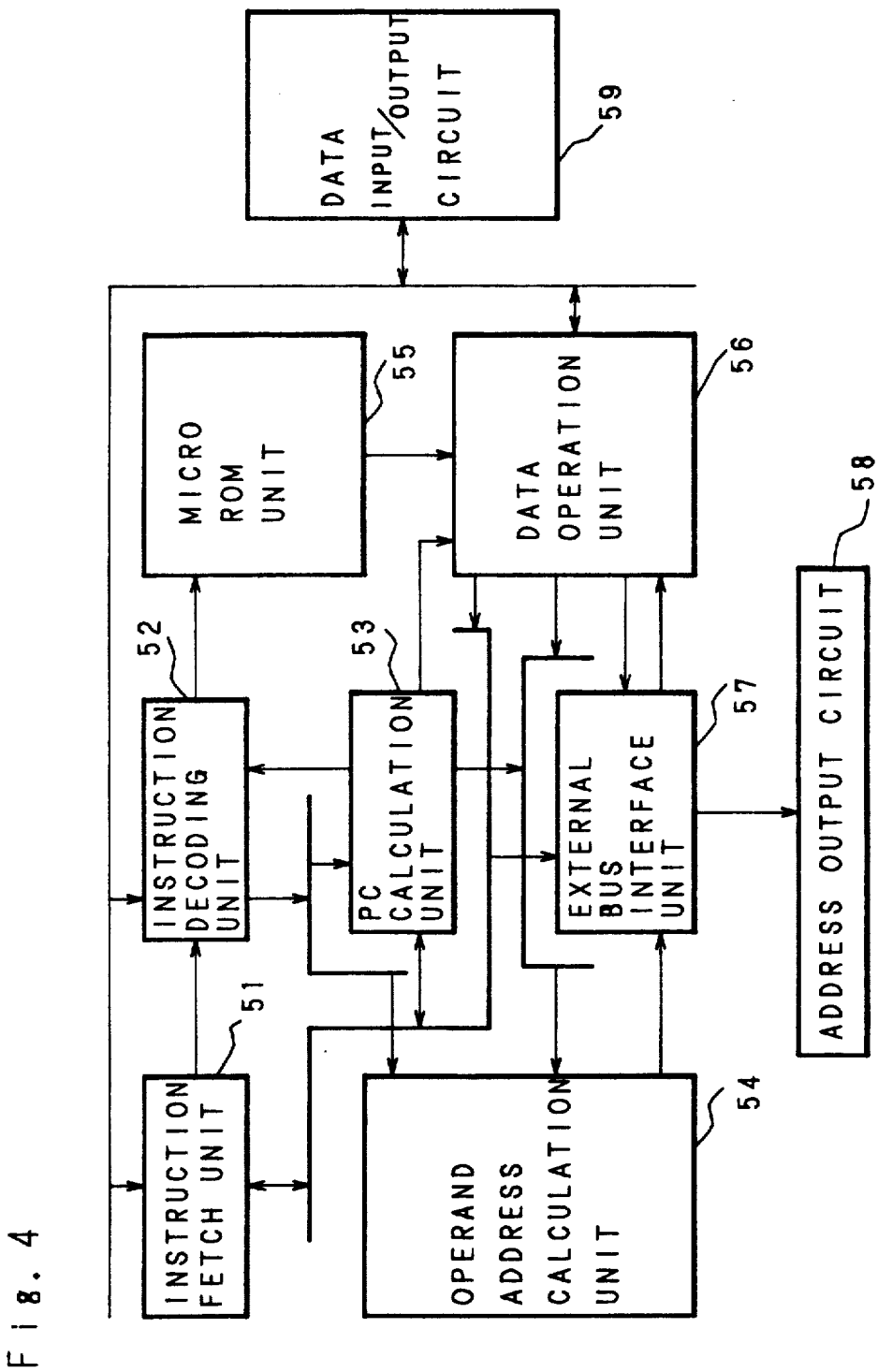
FIG. 4 is a block diagram showing a internal configuration of a data processor of the present invention.

FIG. 4 is a block diagram showing a configuration of the data processor of the present invention.

The interior of the data processor of the present invention is functionally divided roughly into an instruction fetch unit 51, an instruction decoding unit 52, a PC calculation unit 53, an operand address calculation unit 54, a micro ROM unit 55, a data operation unit 56 and an external bus interface unit 57.

In FIG. 4, in addition to the above-described units, an address output circuit 58 for outputting address to the exterior of a CPU and a data input/output circuit 59 for inputting and outputting data from and to the exterior of the CPU are shown being separated from the other function block units.

(1.1) "Instruction Fetch Unit"

The instruction fetch unit 51 which comprises a branch buffer, an instruction queue and a controlling unit thereof, determines the address of an instruction to be fetched next and fetches the instruction from the branch buffer or a memory outside the CPU. It also performs instruction registering to the branch buffer.

The branch buffer is small-scaled, therefore operating as a selective cache.

Detailed description on the operation of the branch buffer is disclosed in the Japanese Patent Application Laid-Open No. 63-56731 (1988) (incorporated herein by reference).

Figure 16:
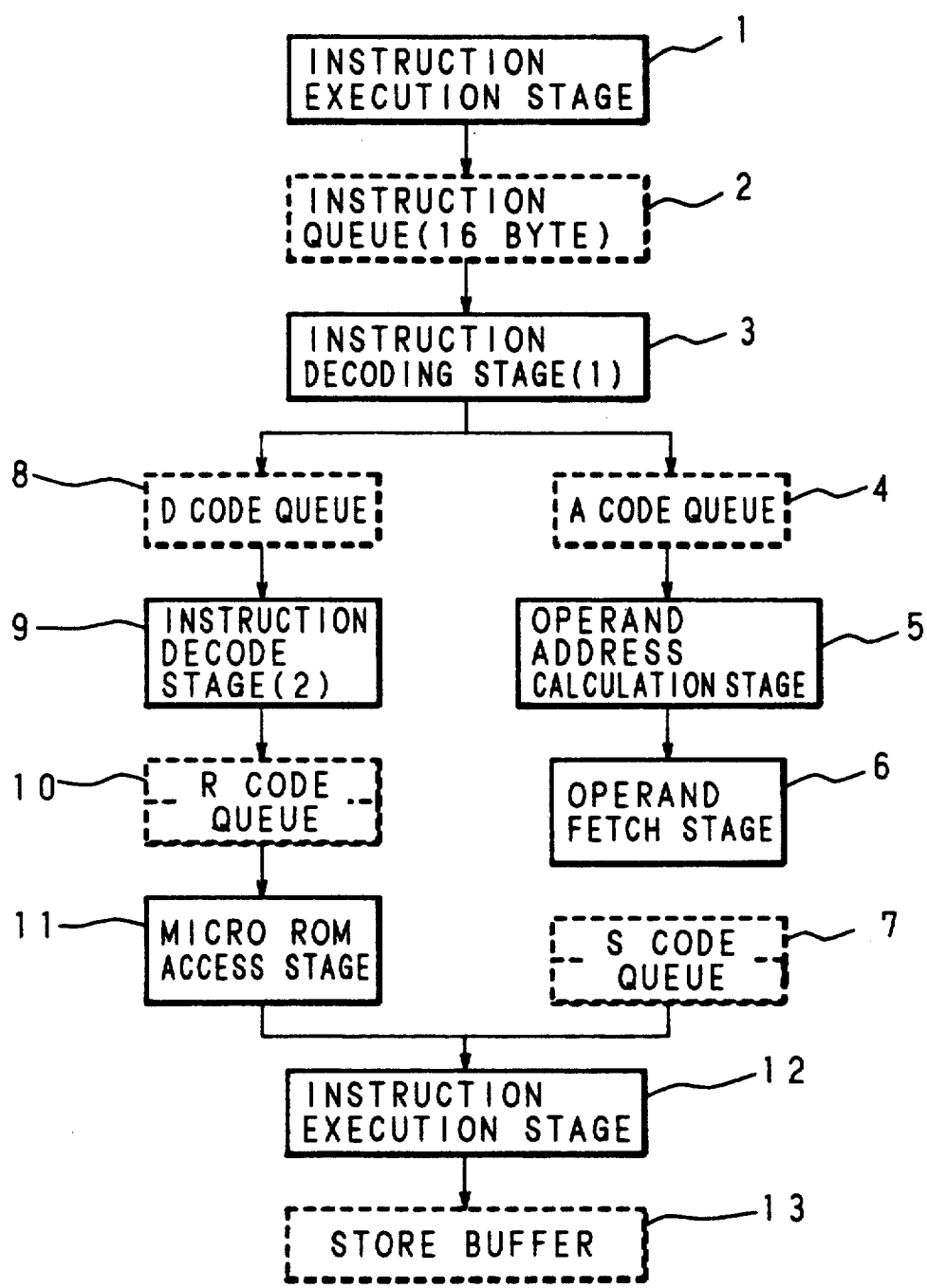
FIG. 16 is a flow chart of pipeline processing of a data processor using a 32-bit microprocessor which is one embodiment of the present invention.

The address of an instruction to be fetched next is calculated by a dedicated counter as the address of the instruction to be inputted to an instruction queue (refer to FIG. 16). In the case where a branch or jump is generated, an address of a new instruction is transferred from rhe PC calculation unit 53 or the data operation unit 56

In the case where an instruction is fetched from a memory outside the CPU, the address of the instruction to be fetched is outputted from the address output circuit 58 to the outside of the CPU through the external bus interface unit 57, and an instruction code is fetched from the data input/output circuit 59. Then, among the instruction codes in buffering, the instruction code to be decoded next is outputted to the instruction decoding unit 52.

(1.2) "Instruction Decoding Unit"

In the instruction decoding unit 52, basically an instruction code is decoded on a 16-bit (half word) basis. This block comprises a FHW decoder for decoding an operation code included in the first half word, a NFHW (not first half word) decoder for decoding an operation code including in the second and the third half words, and an addressing mode decoder for decoding an addressing mode. These FHW decoder, NFHW decoder and addressing mode decoder are generally called the first stage decoder.

There are also the second stage decoder which further decodes an output of the FHW decoder and the NFHW decoder and calculates an entry address of the micro ROM, a branch predicting mechanism for performing branch prediction of a conditional branch instruction, and an address calculation conflict checking mechanism for checking pipeline conflict in calculating an operand address.

The instruction decoding unit 52 decodes the instruction code being inputted from the instruction fetch unit 51 by 0 bytes through 6 bytes bytes per one clock. Among the results of decoding, information on operation in the data operation unit 56 is outputted to the micro ROM unit 55, information on operand address calculation is outputted to the operand address calculation unit 54, and information on PC calculation is outputted to the PC calculation unit 53, respectively.

(1.3) "Micro ROM Unit".

The micro ROM unit 55 comprises a micro ROM for storing microprograms which mainly controls the data operation unit 56, a micro sequencer, and a micro instruction decoder.

A micro instruction is read out from the micro ROM once per one clock. The micro sequencer accepts processings of exception, interruption and trap (these three are generally called EIT) in a hardware manner in addition to the sequential processings shown by the microprograms. The micro ROM unit 55 also controls a store buffer.

To the micro ROM unit 55, there are inputted flag information generated by interruption independent of the instruction code or by the result of operation execution, and output of an instruction decoding unit such as output of a second stage decoder.

Output of the micro decoder is mainly given to the data operation unit 56, but some information such as information of stopping other preceding processing due to execution of a jump instruction is outputted also to other blocks.

(1.4) "Operand Address Calculation Unit"

The operand address calculation unit 54 is controlled in a hardwired manner by information on operand address calculation outputted from the address decoder of the instruction decoding unit 52 or the like. In this operand address calculation unit 54, substantially all processing on operand address calculations is performed. Checking is conducted to determined whether or not the address of memory access for memory indirect addressing and the operand address can be within an I/0 area mapped in the memory.

The result of address calculation is sent to the external bus interface unit 57. The values of the general-purpose register and the program counter required for address calculation are inputted from the data operation unit 56.

In performing the memory indirect addressing, the memory address to be referred is outputted from the address output circuit 58 to the outside of the CPU through the external bus interface unit 57, and the indirect address value inputted from the data input/output unit 59 is fetched through the instruction decoding unit 52.

(1.5) "PC Calculation Unit"

The PC calculation unit 53 is controlled in a hard-wired manner using information on PC calculation outputted from the instruction decoding unit 52. The PC calculation unit 53 calculates the PC value of an instruction.

The data processor of the present invention has a variable-length instruction set, and the length of that instruction can be found only after the instruction is decoded. For this reason, the PC calculation unit 53 generates the PC value of the next instruction by adding the length of the instruction outputted from the instruction decoding unit 52 to the PC value of the instruction in decoding.

In the case where the instruction decoding unit 52 decodes a branch instruction and directs a branch in the decoding stage, the PC value of a branch destination instruction is calculated by adding a branch displacement in place of the instruction length to the PC value of the branch instruction. In the data processor of the present invention, performing a branch in the instruction decoding stage in response to the branch instruction is called pre-branch.

A detailed description of this prebranch approach is disclosed in Japanese Patent Application Laid-Open No. 63-59630 (1988) and Japanese Patent Application Laid-Open No. 63-55639 (1988) (incorporated herein by reference).

The result of calculation in the PC calculation unit 53 is outputted as the PC value of each instruction together with the result of decoding of the instruction, and in addition, is outputted to the instruction fetch unit 51 as the address of the instruction to be decoded next at pre-branch. Also, it is used for the address for branch prediction of the instruction to be decoded next in the instruction decoding unit 52.

A detailed description of the branch prediction approaches is disclosed in Japanese Patent Application Laid-Open No. 63-175934 (1988) (incorporated herein by reference).

(1.6) "Data Operation Unit"

The data operation unit 56 is controlled by microprograms, and executes the operation required for realizing the function of each instruction by means of registers and an arithmetic unit according to output information of the micro ROM unit 55.

In the case where the operand to be operated by an instruction is an address or an immediate, the address or the immediate calculated in the operand address calculation unit 54 is obtained by passing it through the external bus interface unit 57 to the data operation unit 56.

In the case where the operand to be operated on is in a memory outside the CPU, the external bus interface unit 57 outputs the address calculated in the address calculation unit 54 from the address output circuit 58, and the operand fetched from the memory outside the CPU is obtained through the data input/output circuit 59.

Arithmetic units include an ALU, a barrel shifter, a priority encoder, a counter, and a shift register. The registers and the main arithmetic units are connected through three buses, and one micro instruction for directing operation between registers is processed in two clocks.

In the case where an access to the memory outside the CPU is required at the data operation, the address is outputted from the address output circuit 58 to the outside of the CPU through the external bus interface unit 57 under the control of the microprogram, and the target data is fetched through the data input/output circuit 59.

In the case where data is stored in the memory outside the CPU, the address is outputted from the address output circuit 58 through the external bus interface unit 57, and simultaneously the data is outputted from the data input/output circuit 59 to the outside of the CPU.

In order to efficiently perform an operand store, a four-byte store buffer is installed in the data operation unit 56.

In the case where the data operation unit 56 obtains a new instruction address by processing a jump instruction or an exceptional processing, this is outputted to the instruction fetch unit 51 and the PC calculation unit 53.

(1.7) "External Bus Interface Unit"

The external bus interface unit 57 controls communication through the external bus of the data processor of the present invention. All accesses to memories are performed in a clock-synchronized manner, and can be performed in a minimum of two clock cycles.

Access requests to memory are generated independently from the instruction fetch unit 51, the operand address calculation unit 54 and the data operation unit 56. The external bus interface unit 57 arbitrates these memory access requests. Furthermore, access to data located at misaligned words, i.e., memory address which involve crossing over the word boundary of 32 bits (one word) which is the size of the data bus connecting the memory to the CPU is performed in a manner that crossing over the word boundary is automatically detected in this block and the access is decomposed into memory accesses over two steps.

(2) "Pipeline Processing Mechanism"

Figure 5:
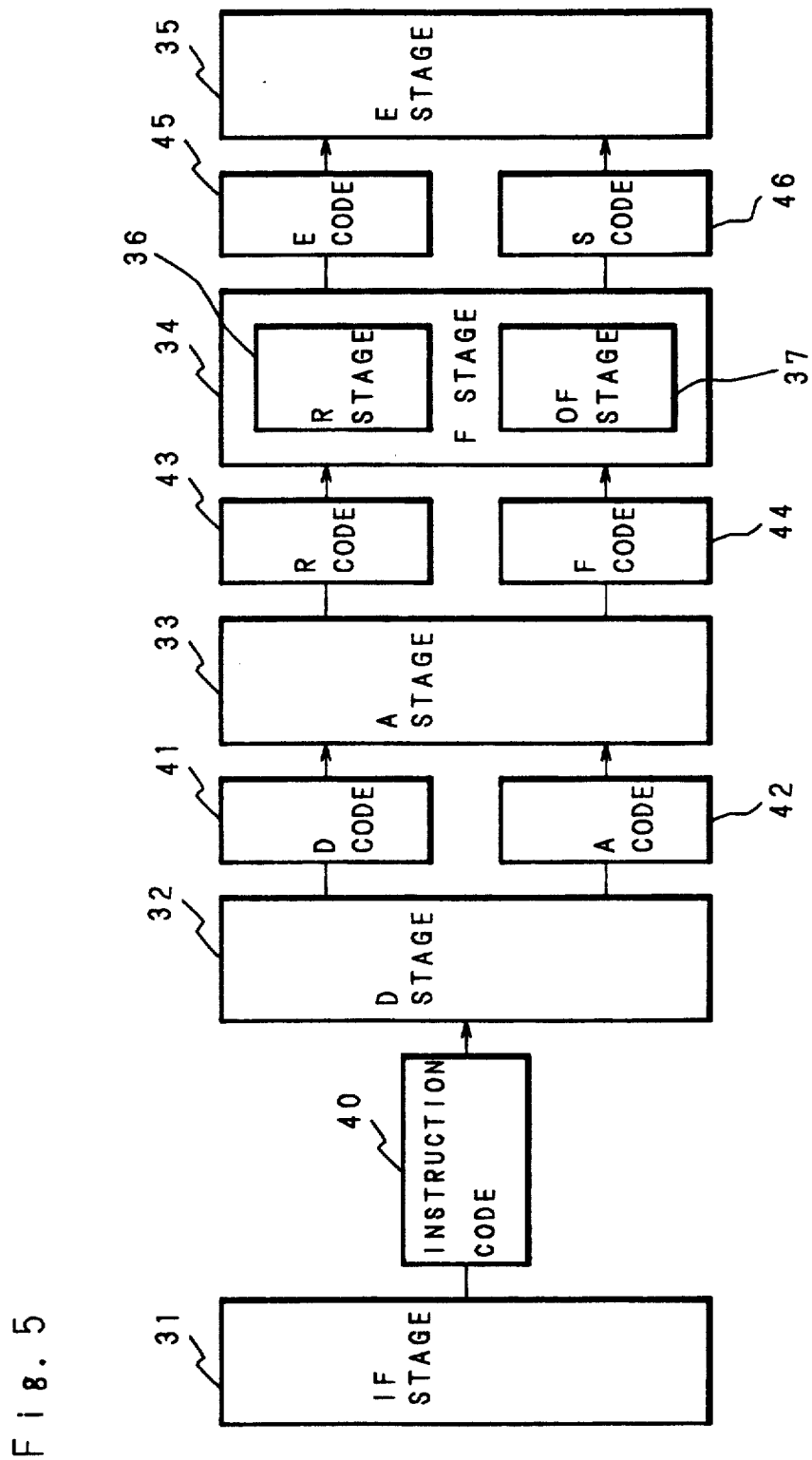
FIG. 5 is a schematic view showing a configuration of a pipeline mechanism of a data processor of the present invention.

FIG. 5 is a schematic diagram showing a pipeline processing mechanism of the data processor of the present invention.

The basis of pipeline processing has a five-stage configuration which comprises an instruction fetch stage (IF stage) 31 for prefetching an instruction, a decoding stage (D stage) 32 for decoding the instruction, an operand address calculation stage (A stage) 33 for performing address calculation of an operand, an operand fetch stage (F stage) 34 consisting of a position for performing micro ROM access (particularly called an R stage 36) and a portion for prefetch an operand (particularly called an OF stage 37), and an execution stage (E stage) 35 for executing an instruction.

The E stage 35 comprises a one-stage store buffer, and besides, in some high-function instructions, the execution itself of the instruction is performed in a pipeline manner, and therefore, an actual effect of pipeline processing of five or more stages is obtainable.

Each stage operates independently from the other stages, and theoretically the five stages make perfectly independent operations. Each stage can perform one-time processing in a minimum of two clock cycles. Accordingly, ideally, the pipeline processing progresses one after another on a two clocks basis.

The data processor of the present invention comprises some instructions which cannot be processed only by the basic pipeline processing of one time such as an operation between memory and memory or a memory indirect addressing, but the data processor of the present invention is specified in such a manner that a balanced pipeline processing can be performed whenever possible for processing of these instructions. For the instruction having a plurality of memory operands, pipeline processing is performed based on the number of memory operands by decomposing it into a plurality of pipeline processing units (step code) at the decoding stage.

A detailed description of the decomposing method of the pipeline processing unit is disclosed in Japanese Patent Application Laid-Open No. 63-89932 (1988) (incorporated herein by reference).

Information transferred from the IF stage 31 to the D stage 32 is an instruction code 40 itself. Information transferred from the D stage 32 to the A stage 33 includes two kinds of information, one on operation specified by an instruction (called a D code 41) and the other on address calculation of an operand (called an A code 42).

Information transferred from the A stage 33 to the F stage 34 includes an R code 43 comprising an entry address of a microprogram and a parameter of the microprogram and an F code 44 comprising an operand address and information for memory access.

Information transferred from the F stage 34 to the E stage 35 is an E code 45 comprising operation control information and literal and an S code 46 comprising an operand and its operand address.

EIT detected in the stage other than the E stage 35 does not start the EIT processing until the code thereof reaches the E stage 35. This is because only the instruction processed in the E stage 35 is an instruction at the step of executing, and the instructions having been processed between the IF stage 31 and the F stage 34 do not reach the step of executing yet. Accordingly, for the EIT detected in the stage other than the E stage 35, the detection thereof is recorded in the step code, and it is only transmitted to the following stage.

(2.1) "Pipeline Processing Unit"

(2.1.1) "Classification of Instruction Code Field"

The pipeline processing unit of the data processor of the present invention is determined by utilizing the feature of the format of an instruction set.

The instruction of the data processor of the present invention is a variable-length instruction of two-byte unit, and basically the instruction is configurated by repeating one to three times "a two-byte instruction base field + an addressing extension part of 0 to 4 bytes.

In many cases, the instruction base field comprises an operation code field and an addressing mode specifying field, and in the case where index addressing or memory indirect addressing is required, "a two-bytes chained addressing mode specifying field + an addressing extension part of 0 to 4 bytes" is affixed by an arbitrary number in place of the addressing extension field. The extension field of two or four bytes which is peculiar to the instruction is also affixed lastly depending on the instruction.

The instruction base field comprises an operation code of an instruction, a basic addressing mode, literal and the like. The addressing modification field is any one of a displacement, an absolute address, an immediate value and a displacement of branch instruction. The extension part peculiar to the instruction comprises a register map, an immediate value specifying of the I-format instruction and the like.

Figure 6:
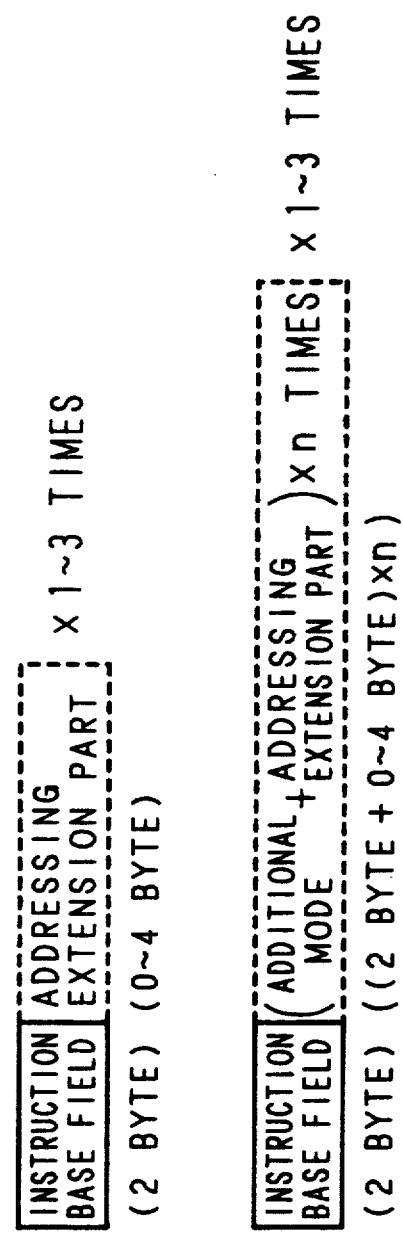
FIG. 6 is a schematic view showing an instruction format of a data processor of the present invention.

FIG. 6 is a schematic diagram showing the feature of the basic instruction format 310 of the data possessor of the present invention.

(2.1.2) "Decomposition of Instruction into Step Code"

The data processor of the present invention performs pipeline processing making the most of the feature of the above-mentioned instruction format.

In the D stage 23, "a two-byte instruction base field + an addressing extension field of 0 to 4 bytes", "a chained addressing mode specifying field + an addressing extension part", or an extension part peculiar to the instruction is processed as one decoding unit. The decoded result of each time is called a step code. In and after the A stage 33, this step code is taken as a unit of pipeline processing. The number o step codes is peculiar to each instruction. In the case where chained addressing mode specifying is not performed, one instruction is divided into a minimum of one step code to a maximum of three step codes. In the case where chained addressing mode specifying is performed, the number of step codes is increased by a number as required. Note that this is performed only in the decoding step as described later.

(2.1.3) "Control of Program Counter"

All of the step codes existing on the pipeline of the data processor of the present invention have a possibility of being for another instruction, and for this reason, the value of the program counter is controlled on a step code basis. All of the step codes have a program counter value of the instruction whereon that step code is based.

The program counter value flowing through each stage of the pipeline while accompanying the step code is called a step program counter (SPC). The SPC is transferred sequentially from one pipeline stage to the other.

(2.2) "Processing of Each Pipeline Stage"

As shown in FIG. 5, for the sake of convenience, names are given to the input and output step codes of each pipeline stage. The step codes perform processing relating to the operation codes, and include two series; a series becoming entry addresses of microprograms and parameters for the E stage 35 and a series becoming operands for microinstructions of the E stage 35.

(2.2.1) "Instruction Fetch Stage"

The instruction fetch stage (IF stage) 31 fetches an instruction from the memory or the branch buffer, inputs it to the instruction queue, and outputs an instruction code to the D stage 32. Input of the instruction queue is performed in an aligned four-byte unit. In the case where an instruction is fetched from the memory, a minimum of two clock cycles are required for the aligned four bytes. In the case where the branch buffer hits, fetching can be made in one clock per aligned four bytes. The output unit of the instruction queue is variable on a two-byte basis, and a maximum of six bytes can be outputted during two clocks. Immediately after a branch, two bytes of the instruction base field can also be transferred directly to the instruction decoder by by-passing the instruction queue.

Control of registering and clearing of the instruction to the branch buffer, management of addresses of the instructions to be prefetched and control of the instruction queue are also performed in the IF stage 31.

The EITs detected in the IF stage 31 include a bus access exception in fetching an instruction from the memory or an address translation exception due to memory protection violation.

(2.2.2) "Instruction Decoding Stage"

The instruction decoding stage (D stage) 32 decodes an instruction code inputted from the IF stage 31. Decoding is performed by two clock cycles basis using the first stage decoder consisting of the FHW decoder, the NFHW decoder and the addressing mode decoder in the instruction decoding unit 52. An instruction code of 0 to 6 bytes is consumed in the decoding processing during one operation thereof (no instruction code is consumed in the outputting processing of the step code comprising the return address of the RET instruction). By one operation of the decoding unit, about 35 bits of the control code which is the A code 42 as address calculation information, maximum of 32 bits of address modification information, about 50 bits of the control code which is the D code 41 as the result of intermediate decoding of the operation code, and eight-bit literal information are outputted from the D stage 32 to the A stage 33.

In the D stage 32, control of the PC calculation unit 53 of each instruction, branch prediction processing, prebranch processing for the prebranch instruction and outputting processing of the instruction code from the instruction queue are also performed.

The EITs detected in the D stage 23 include a reserved instruction exception and an odd address jump trap at prebranch. Various EITs transferred from the IF stage 31 are also transferred to the A stage 33 through processing of encoding into the step code.

(2.2.3) "Operand Address Calculation Stage"

Processing functions of the operand address calculation stage (A stage) 33 are roughly divided into two parts. One is processing for post-decoding of the operation code using the second stage decoder of the instruction decoding unit 52 and the other is for calculation of an operand address in the operand address calculation unit 54.

The post-decoding processing of the operation code inputs the D code 41 and outputs the R code 43 comprising write reserve of register and memory, an entry address of a microprogram and parameters for the microprogram. In addition, the write reserve of the register or memory is for preventing a illegal address calculation by re-writing the content of the register or memory referred in the address calculation of an instruction with the instruction preceding on the pipeline.

To avoid a dead lock, the write reserve of the register or memory is performed on an instruction basis rather than on a step code basis.

A detailed description of the write reserve to the register or memory is provided in Japanese Patent Application No. 62-144394 (1987) (incorporated herein by reference).

The operand address calculation processing inputs the A code 42, performs addition in the operand address calculation unit 54 according to the A code 42 or performs address calculation by combining memory indirect reference, and outputs the result of the calculation as the F cord 44. At this time, a conflict check is done in reading-out of the register and the memory attending on the address calculation. If a conflict is indicated because the preceding instruction has not completed the writing processing to the register or the memory, the processing waits until the preceding instruction completes the write processing in the E stage 35. A check is done for whether or not the operand address and the address of memory indirect reference can enter the I/0 area mapped in the memory.

The EITs detected in the A stage 33 include the reserved instruction exception, privilege instruction exception, bus access exception, address translation exception land debugging trap generated by an operand break point hit at memory indirect addressing. When it is indicated that the D code 41 or the A code 42 itself has caused EIT, the A stage 33 does not perform address calculation processing for that code, and that EIT is transmitted to the R code 43 and the F code 44.

(2.2.4) "Micro ROM Access Stage"

Processing of the operand fetch stage (F stage) 34 is also divided roughly into two parts. One is access processing of the micro ROM, particularly called the R stage 36. The other is operand prefetch processing, particularly called the OF stage 37. The R stage 36 and the OF stage 37, which do not necessarily operate at the same time, operate independently depending on whether or not the memory access right can be acquired.

The micro ROM access processing which is the processing of the R stage 36 is the micro ROM access and micro instruction decoding processing for generating the E code 45 which is an execute control code used for execution in the following E stage 35 for the R code 43. In the case where processing for one R code 43 is decomposed into two or more microprogram steps, the micro ROM is used in the E stage 35, and the following R code 43 waits for micro ROM access. Micro ROM access using the R code 43 is performed when the last micro instruction is executed in the preceding E stage 35. In the data processor of the present invention, almost all of the basic instructions are executed in one microprogram step, therefore, there are many actual cases in which the micro ROM accesses to the R code 43 are performed one after another.

There is no EIT to be detected anew in the R stage 36. When the R code 43 indicates the EIT of instruction processing re-execution type, the microprogram for that EIT processing is executed, and therefore the R stage 36 fetches the microinstruction according to the R code 43. In the case where the R code 43 indicates an odd address jump trap, the R stage 36 transmits it through the E code 45. This is for prebranch, and in the E stage 35, if no branch is made that E code 45, an odd address jump trap is generated with the prebranch being effective.

(2.2.5) "Operand Fetch Stage"

The operand fetch stage (OF stage) 37 performs operand prefetch processing among the above-mentioned two processings performed in the F stage 34.

Operand prefetch processing inputs the F code 44 and outputs the fetched operand and the address thereof as the S code 46. One F code 44 may cross over the word boundary, but specifies operand fetching of four bytes or less. The F code 44 also comprises specifying of whether or not access to the operand is to be performed. In the case where the operand address itself o the immediate calculated in the A stage 33 is transferred to the E stage 35, no operand prefetch is performed, and the content of the F code 44 is transferred as the S code 46. In the case where tho operand intended to be prefetched coincides with the operand intended to be write-processed in the E stage 35, no operand prefetching is performed from the memory, but operation of the prefetch is performed by by-passing it. For the I/0 are, the operand prefetch is delayed, and operand fetch is performed only after all preceding instructions have been completed.

The EITs detected in the OF stage 37 include a bus access exception, an address translation exception, and a debugging trap generated by a break point hit to the operand prefetch. When the F code 44 indicates an EIT other than the debugging trap, it is transferred to the S code 46, and no operand prefetch is performed. When the F code 44 indicates a debugging trap, the same processing as the case where no EIT is indicated for that F code 44 is performed, and the debugging trap is transmitted to the S code 46.

(2.2.6) "Execution Stage"

The execution stage (E stage) 35 operates with the E code 45 and the S code 46 taken as inputs. This E stage 35 is a stage for executing instructions, and all processings performed in the stages before and in the F stage 34 are pre-processings for the E stage 35.

In the case where a jump instruction is executed in the E stage 35 or the EIT processing is started, all the processings from the IF stage 31 to the F stage 34 are disabled. The E stage 35 is controlled by microprograms, and the instruction is executed by executing a series of microprograms starting with the entry address of microprogram indicated in the B code 43.

Read of the micro ROM and execution of the microinstruction are performed in a pipeline manner. Accordingly, in the case where a branch takes place in the microprogram, a gap (blank) of one microstep is generated. The E stage 35 can also perform pipeline processing of an operand store of four bytes or less and the following microinstruction execution by utilizing the store buffer in the data operation unit 56.

The processing using the store buffer is executed only in the case where write processing is executed at the last step of the microprogram.

In the E stage 35, the write reserve to the register and the memory performed in the A stage 33 is released after write of the operand.

In the case where a conditional branch instruction generates a branch in the E stage 35, the branch prediction for that conditional branch instruction has been illegal, and therefore rewriting of the branch history is performed.

The EITs detected in the E stage 35 include bus access exception, address translation exception, debugging trap, odd address jump trap, reserved function exception, illegal operand exception, reserved stack format exception, zero divide trap, unconditional trap, conditional trap, delayed context trap, external interruption, delay interruption, reset interruption and system faults.

The EITs detected in the E stage 35 are all EIT-processed, but the EITs which are detected between the IF stage 31 and the F stage 34 before the E stage 35 and are reflected in the R code 43 or the S code 46 are not necessarily EIT-processed. All the EITs which are detected among from the IF stage 31 to the F stage 34, but do not reach the E stage 35 because the preceding instruction has executed a jump instruction in the E stage 35 or the like are all canceled. The instruction having caused that EIT is assumed to have not been executed from the beginning.

Various interruption are accepted directly to the E stage 35 at a timing of a pause of the instruction, and necessary processing is executed by microprograms. Processings of other various EITs are performed by microprograms.

(2.3) "Status Control of Each Pipeline Stage"

Each stage of the pipeline has an input latch and an output latch, and is based on operation independent of other stages. Each stage starts the next processing after such whole processes as the one-preceding processing has been completed, the result of that processing has been transferred from the output latch to the input latch of the next stage, and all input signals required for the next processing have been prepared in the input latch of the stage of its own.

This means that each stage starts the next processing after such whole processes as all the input signals to the next processing outputted from the one-preceding stage are enabled, the result of the current processing is transferred to the input latch of the post-stage, and the output latch becomes empty.

In other words, it is required that all input signals are prepared at a timing with one clock before the operation start in each stage. If the input signals are not all prepared, that stage is put in the waiting state (input waiting). For transferring from the output latch to the input latch of the next stage is done, it is required that the input latch of the next stage is in the empty state, and when the input latch of the next stage is not empty, the pipeline stage is also put in the waiting state (output waiting). If the required memory access right cannot be acquired, or wait is inserted into the memory access under processing, or another pipeline conflict occurs, the processing itself of each stage is delayed.

(3) "EIT Processing"

Next, the EIT processing in a data processor of the present invention will be explained.

(3.1) "Outline of EIT"

In the data processor of the present invention, an event of suspending a flow of program execution such as Exception, Interrupt and Trap by a hardware mechanism and requesting processing by the separate programs is generally called the EIT processing. EIT is a general term for Exception, Interrupt and Trap.

When the EIT occurs, the processor starts the EIT processing in the midway or at completion of the instruction being executed at that time point. The EIT processing is executed by hardwares, and various information such as the occurring location and dominant causes of EIT and information for restarting the suspended program are saved on a stack, and finally, an EIT handler is started based upon information shown in an EIT vector table.

The EIT handler is a program which is usually built in as a part of OS (Operating System) for processing recovery of errors, message display, emulation etc. corresponding to the EIT.

In order to return to the original program suspended, an REIT (Return from EIT) instruction in the EIT handler is executed. By the REIT instruction, the state of the processor is restored in response to information saved on the stack by the EIT processing, and execution of the instruction is restarted by returning to the address before occurrence of the EIT.

EIT processings are constituted as follows.

Exception

This is caused by the error and violation following execution of instructions. It is an event related to a context being executed at occurrence thereof. When the original program is reexecuted, the instruction producing the Exception is executed first. That is, the instruction producing the Exception is reexecuted. The processing canceled type EIT to be described later is used.

Interrupt

It is an event which occurs independently of a context being executed at occurrence. It occurs either by the external hardware signals or by the request of softwares.

Trap

It occurs either by the error or violation following execution of instructions, or consciously by the programmer at effectuation of the system call. It is an event related to a context being executed at occurrence. Different from the Exception, when restarting execution of the original program, the next instruction from the one producing the Trap is executed first. The processing completed type EIT to be described later is used.

Figures 7, 8:
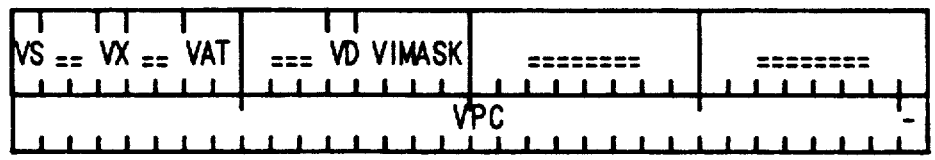
FIG. 7 is a table showing an EIT classifications of a data processor of the present invention.
FIG. 8 is a schematic view showing a format of an EIT vector table (EITVTE) of the data processor of the present invention.

Classifications of the EIT are shown collectively in FIG. 7.

In the data processor of the present invention, a one-word buffer called a store buffer is used in writing control.

When errors are detected in the last operand writing stage of execution of instruction and the EIT is generated, a method of restarting the instruction from reexecution of the operand writing at completion of the EIT processing handler is sometimes employed. In this case, reexecution of the operand writing is processed in the REIT instruction, and the original program is executed from the instruction next to the one which generates the EIT. Such an EIT is also treated as the Trap (processing completed type).

In bus access errors related to the memory access, it sometimes becomes Trap (processing completed type) when related to the store buffer, and becomes Exception (processing canceled type) in the case of other operand readings.

(3.2) "Types of EIT"

EITs detected by the data processor of the present invention are as follows,

"Related to Memory and Address"

Address Translation Exception: ATRE and Address Translation Trap: ATRT

They occur by an improper memory access. In the case of data processor of the present invention, since the address translation is not performed, specifically, the Address Translation Exception occurs at the memory protection violation and when an improper access related to an I/O area is generated. Since it becomes the instruction processing canceled type other than the store buffer operation, ATRE is generated, and in the store buffer operation it becomes the instruction processing completed type, so that ATRT is generated.

Bus Access Exception: BAE and Bus Access Trap: BAT

They occur when, in the instruction or operand access, there is no response from buses within constant time and no memory access is made, or in so-called bus error. Since it becomes the instruction processing canceled type other than the store buffer operation, BAE is generated and in the store buffer operation it becomes the instruction processing completed type, so that BAT is generated.

Odd Address Jump Trap: OAJT

It occurs when the branch destination address is the odd number, when processing the branch instruction. The Exception occurs by the instruction (JMP, ACB etc.) which directly specifies the jump destination as operand and the instruction (RTS, EXITD, RRNG, REIT), which obtains the return address from the stack. It does not occur at starting the EIT processing.

When the new PC value is an odd number at starting the EIT processing, it becomes the system error (SE).

"Related to Instruction and Operation"

Privileged Instruction Violation Exception: PIVE

It occurs when executing the privileged instruction from other than ring 0.

Reserved Instruction Exception: RIE

It occurs when executing the instruction which is not allocated at present or the bit pattern of the addressing mode, or the Exception of a so-called undefined instruction. In the data processor of the present invention, since the unsigned decimal instruction which is the current <<L1>> specification instruction and the coprocessor instruction are not supported: RIE occurs for these instructions. In the data processor of the present invention, cases wherein a 64-bit size is designated, a P-bit is "1", the unmounted instruction is executed and the undefined or unmounted option is designated are also included. The case wherein an addressing mode forbidden by the instruction is used such as the immediate designation in the JMP instruction is also included.

Reserved Function Exception: RFE

It occurs when using the function reserved for the future extension in other than the bit pattern of the instruction or addressing mode. In the data processor of the present invention, the case wherein errors can be judged only by the instruction bit pattern including the addressing mode or size specification is the Reserved Instruction Exception (RIE), and the case wherein the condition of whether or not the error is changed by the address or operand value is the Reserved Function Exception (RFE).

Illegal Operand Exception: IOE

It occurs when the unreasonable operand is designated. The case wherein a width above 32(64) bits is designated by the fixed length bit field instruction is included.

Though a jump to the odd address or a zero division is also significantly considered as a part of Illegal Operand Exception, it is classified as a different Exception because it has a special meaning.

As the counter measure for the case wherein the instruction operand is unreasonable in the data processor of the present invention, there are such cases wherein particularly no check is conducted and the instruction is executed as it is by interrupting suitably (such as the case wherein the count by the shift instruction is large), besides the case of Illegal Operand Exception or Zero Divide Exception. Meanwhile, when the result of execution is unreasonable (such as occurrence of overflow), the EIT is not started. In this case, there are such cases as setting an overflow flag to complete the instruction (many cases such as ADD, MOV etc.), and particularly doing nothing (such as overflow in UNPKss).

Reserved Stack Format Exception: RSFE

It occurs when the number (FORMAT) indicating an EIT stack frame format can not be processed by the REIT instruction, when returning from the EIT by the REIT instruction.

Zero Divide Trap: ZDT

It occurs when conducting a zero division.

"Debugging"

Self Debug Trap: SDBT

It occurs in relation to the Debugging. Specifically, it is the Exception for realizing single step execution or breakpoint of the instruction. The detecting conditions and states are indicated by a DB bit which is one bit of PSW (Program Status Word) and a DBC (Debug Control) register. The configuration of PSW will be described later.

It is to be noted that detection of a Debug event is determined by PSW and DB before execution, and starting itself of the Self Debug Trap is determined by the PSW.DB bit after execution. Accordingly, in the instruction (instruction generating the EIT, LDC, REIT) which has a possibility of rewriting PSW, special attention must be given to the detecting and starting conditions of the Self Debut Trap.

"Trap"

Unconditional Trap Instruction (TRAPA Instruction): TRAPA

It occurs by the TRAPA instruction.

16 types of EIT vector of the TRAPA are prepared corresponding to the operand vectors.

Conditional TRAP Instruction: TRAPcc

It occurs by the TRAP instruction.

"DCT, DI"

Delayed Interrupt: DI

It occurs when a DI field in a DI register shows a smaller value than an IMASK field in the PSW.

This FIT is effective for processing an asynchronous event independent from the context.

15 types of EIT vectors of DI processing are prepared for each interruption priority.

Though this EIT is Exception as regards it is generated by execution of the REIT instruction, it is Interrupt in a sense that it is started independently of the context being executed at that time point.

That is, it is between the Exception and Interrupt (through the PSW including the IMASK field is dependent upon the context, the IMASK field proper is usually employed independently of the context).

Delayed Context Trap: DCT

It occurs when the DCE field in the CSW register becomes a smaller value than the SMRNG field in the PSW.

This Exception is effective for processing various asynchronous events (completion of input/output etc.) dependent upon the context.

"Others"

Reset Interrupt: RI

It occurs by the external reset signal.

System Error: SE

It occurs when a fatal error is generated during EIT processings.

"Interrupt"

External Interrupt: EI

It occurs by the external hardware signals.

There are the cases that EIT vectors are designated externally and having a fixed value for each Interrupt priority. When the vector value is all one in the interrupt acknowledge cycle, it becomes the EIT of vector (auto-vector) number decided for each priority.

In general, the External Interrupt is checked between instructions. In the case of data processor of the present invention, however, there are high function instructions whose upper limit of the execution time is not fixed (arbitrary length bit field instruction, storing instruction, QSCH instruction). In these instructions, the External Interrupt is adapted to be received even during execution.

Among the EITs aforementioned, distinctions between the Reserved Exception, Illegal Exception and Violation exception are based upon the following concepts.

Reserved XXX Exception

Those having a possibility of being dissolved by extending function. There is a possibility that it turns into other than the Exception by the future function extension.

Illegal XXX Exception

Those which are apparently error significantly. Different from Reserved Exception, it remains as the Exception permanently even when there is a future function extension.

XXX Violation Exception

Those limiting execution from a viewpoint of the ring protection.

Others

Exception from a viewpoint of the OS or system configuration, and the Exception applicable to plural classifications.

(3.3) "EIT Operation"

When a processor detects the EIT, which is processed in accordance with the following procedures. However, the Reset Interrupt (RI) and System Error Exception (SEE) are operated differently.

(E1) Generation of Vector No.

The processor generates the vector no. responsive to the EIT therein. However, in the case of External Interrupt EIT, the EIT vector no. is obtained externally from the processor such as peripheral LSIs.

(E2) Reading of EITVTE

In the data processor of the present invention, a table showing correspondence between start addresses of processing handlers relative to respective EITs and the EIT vector numbers is referred to as a vector table (EITVT). One entry of the table is called EITVTE. Taking into account of the degree of flexibility and extensibility, the data processor of the present invention comprises 8 bytes, and not only the start address (PC) of the EIT processing handler, but also some fields of PSW can be set. Accordingly, the EITVTE has a configuration proportional to PC+PSW. A format of EITVTE is as shown in FIG. 8.

Symbols in FIG. 8 designate following meanings.

| | |
|---|---|
| VS (Vector SM): | SM after EIT processing. Here, VS is not SM after the EIT processing as it is, detailed to be described later. |
| VX (Vector XA): | XA after EIT processing. It is reserved to 0 at present (neglect at Violation). |
| VAT (Vector AT): | At after EIT processing. |
| VD (Vector DB): | DB after EIT processing. |
| VIMASK (Vector IMASK): | IMASK after EIT processing. Here, VIMASK does not become IMASK after the EIT processing as it is, details to be described later. |
| VPC (Vector PC): | PC after EIT processing. |
| '=': | reserved to 0 (neglect at Violation). |
| '—': | reserved to 0 (System Error Exception at Violation). |

The processor reads the EITVTE in the address of (EIT Vector No.)X 8 +EITVTB, according to the EIT Vector No. generated in (EI).

(E3) Updating of PSW

Figure 9:
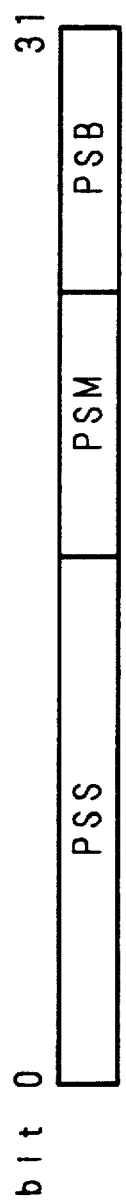
FIG. 9 is a schematic view showing a configuration of processor status word (PSW)

PSW is updated as shown in FIG. 9 based upon the read in EITVTE. At this time, it results in a system error when a reserved value is to be set in PSW.

In addition, the PSW comprises three blocks, PSS, PSM and PSB.

Figure 10:
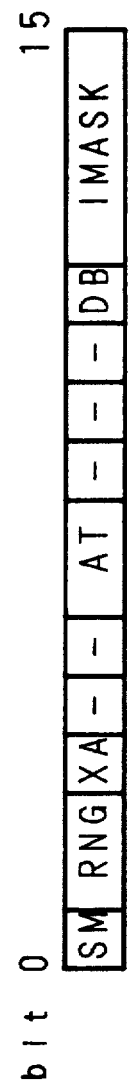
FIG. 10 is a schematic view showing a configuration of a PSS of the PSW.

The PSS is constituted as shown in FIG. 10. Symbols in FIG. 10 designate the following meanings;

| | |
|---|---|
| —: | reserved to "0". when "1" is to be written, the Reserved Function Exception (RFE) occurs. |
| SM,RNG = 000: | use External Interrupt Stack Pointer (SP1) at ring 0. |
| SM,RNG = 001: | reserved. |
| SM,RNG = 010: | reserved. |
| SM,RNG = 011: | reserved. |
| SM,RNG = 100: | use Stack Pointer for ring 0 (SP0) at ring 0. |
| SM,RNG = 101: | use Stack Pointer for ring 1 (SF1) at ring 1. |
| SM,RNG = 110: | use Stack Pointer, for ring 2 (SP2) at ring 2. |
| SM,RNG = 111: | use Stack Pointer for ring 3 (SP3) at ring 3. |
| XA = 0: | 32-bit context. |
| XA = 1: | 64-bit context. |
| AT=00: | no address translation. |
| AT=01: | address translation. |
| AT=10: | memory protection with no address translation. |
| AT=11: | reserved. |
| DB=0: | context not under debugging. |
| DB=1: | context under debugging. |
| IMASK: | Interrupt Priority forbidding External Interrupt (EI, FEVI) and Delayed Interrupt (DI). |

Figure 11:
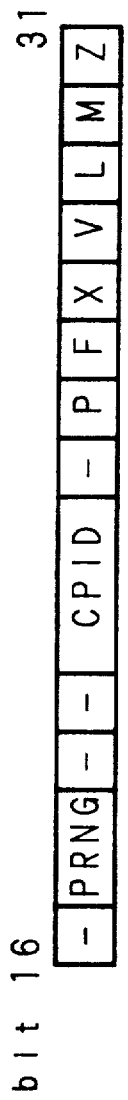
FIG. 11 is a schematic view showing a configurations of a PSM and PSB of the PSW.

A configuration of PSM and PSB is shown in FIG. 11. Symbols in FIG. 11 designate following meanings.

—: reserved to 0.
    When "1" is to be written, the Reserved Function Exception (RFE) occurs.
PRNG: Ring No. of the state before entering the ring.
CPID: ID No. of the coprocessor.
P:  P-bit Error Flag.
    The flag is set when an error related to the P-bit function occurs, and cleared in other cases. It is reserved to 0 at present, the Reserved Function Exception (RfE) occurs when "1" is to be written.
F:  General Flag.
    It is used for judging end causes of the high function instruction.
X:  Extension Flag.
    It indicates a carry for multiple length calculation.
V:  Overflow Flag.
    It indicates the overflow.
L:  Lower Flag.
    It indicates that the first operand is smaller in comparison instruction.
M:  MSB Flag.
    It indicates that resulting MSB of calculation is "1".
Z:  Zero Flag.
    It indicates that the calculated result is "0".

"Other Cases besides Interrupt"
  min (VS, old SM) → new SM
    Selection of a stack pointer, when the stack pointer other than the SP1 is used before occurrence of EIT, the stack pointer (SP0 or SP1) used in the EIT processing handler is selected by VS. When the SP1 is used already before occurrence of the EIT, it is used also in the EIT processing handler independently of VS. This specification is employed because of considering the case of the EIT nesting.
  old RNG → new PRNG
  00 → new RNG
    The EIT processing handler is always executed by the ring 0.
    Since there is unused bits in the EITVTE, it is possible to designate so as to enter the ring other than the ring 0 by EIT for the future.
  VX  new XA
  →
    It is fixed at 0 at present.
  VAT → new AT
    Presence of address translation can be switched during execution of the EIT processing handler.
  VD  new DB
  →
    Environment of Debug can be switched during execution of the EIT processing handler. The Self Debug Trap may be inhibited at detection of the multiple EIT.
  min (VIMASK, old IMASK) → new IMASK
    Also in the case of EIT by the Exception Interrupt and External Interrupt, IMASK can be controlled by EIT processing. When using this function, the External Interrupt can be inhibited at the same time as entering to the EIT processing. Thus, this function is efficacious when some processing, such as transferring of the stack frame generated by the -continued EIT, is desired inseparably with the EIT processing.
"In the Case of Interrupt"
    min (VS, old SM) → new SM
    old RNG → new PRNG
    00 → new RNG
    VX → new XA
    VAT → new AT
    VD → new DB DB = "0" is a must in the External Interrupt handler
        to inhibit and delay the Self Debut Trap detected
        simultaneously when the External Interrupt is
        received during execution.
    min (VIMASK, priority of the External Interrupt
    generated) → new IMASK
        Only this portion is different from the case other
        than the External Interrupt.
        A low priority multiple Interrupt can be inhibited
        by this function. By the Interrupt mask function,
        the relationship of
            Generated External Interrupt priority
                                        < new IMASK
        must have been met.

(E4) Saving Processor Information on Stack

Old PC and old PSW before occurrence of the EIT and various information related to the generated EIT including the EITNF-EIT vector, stack format etc. are saved on the stack. The stack used for saving is the one selected by the new SM and new RNG (=00).

Figure 12:
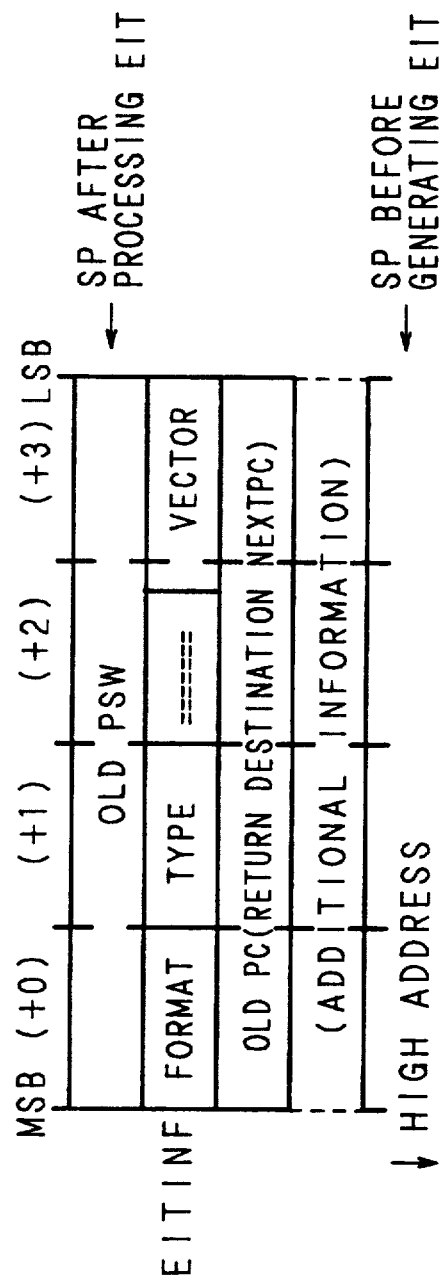
FIG. 12 is a schematic view showing a configuration of a stack for saving various information related to old PSW, old PC and EIT produced at occurrence of the EIT.

A stack frame generated at this time is as shown in FIG. 12.

Among these, the EITINF is information on a stack frame format (FORMAT) being generated by the EIT occurred, a type (TYPE) of EIT, a vector No. (VECTOR) of EIT etc. padded in 32 bits. Presence and contents of the additional information differ by the types of EIT. In the REIT instruction, by looking at the FORMAT in the EITINF, the presence and its format of the additional information are known and information for returning to the original instruction sequence before occurrence of the EIT is obtained.

(E5) Starting of EIT Processing Handler

VPC is transferred to PC to start the EIT processing handler. When the multiple EIT is detected and the unprocessed EIT at this time point is not delayed and inhibited, the EIT is processed successively.

On the contrary, in the REIT instruction at the end of the EIT processing handler, the following processings are conducted to return to the original instruction train.

(R1) Reading from Stack

The old PSW and EITINF are read from the stack. When the XA bit in the PSW read is zero, since it becomes clear that the context (task and process) generating the EIT was the 32-bit context, the old PC is used successively from the stack in 32-bit width. In the M33210, all of the contexts are the 32-bit context.

Furthermore, presence of additional information is judged by the FORMAT in the EITINF, and when there is any, it is read from the stack. The additional information comprise EXPC, IOINF, ERADDR, ERDATA, SPI and so on.

When the FORMAT is a value not supported by the processor such as the value which never occurs in the EIT, it becomes the Reserved Stack Format Exception (RSFE).

(R2) Return of PSW

All fields (SMRNG, XA, AT, DB, IMASK, PSW, PSB) of PSW are returned to the values before occurrence of the EIT by the old PSW read from the stack. At this time, when the old PSW has included the reserved value, the Reserved Function Exception (RFE) is generated.

(R3) Reexecution of Store Buffer

Depending upon the FORMAT and the value of additional information, a write cycle is sometimes reexecuted by the store buffer generating the EIT previously in the REIT instruction. At this time, as information of address and data necessary for executing the write cycle, ERADDR and ERDATA in the additional information on the stack are used. When reexecution of the store buffer has started the EIT, it is treated as the EIT (type 4, format 1) of the REIT instruction.

(R4) Return to the Instruction Train being Executed at EIT Detection

Old PC read from the stack is returned to the PC, and execution is restarted from the instruction indicated by the PC. At this time, the EIT received next is restricted by the TYPE field in EITINF. In the REIT from the processing handler of types 2 to 4, the Self Debug Trap is not started. This function is for receiving the Interrupt during the execution, and at the same time, processing to delay starting of the Self Debug Trap till completion of the execution, when the debug event is detected.

It is for providing information to the EIT processing handler program, that the vector is included in EITINF in spite of the fact that the VECTOR field of the EITNF is not used particularly in the REIT instruction.

(3.4) "Types of EIT"

EIT of the data processor of the present invention may be classified as follows, when aiming at a PC position at restarting of execution after completing the EIT processing handler and the EIT processing priority. This classification corresponds as it is to the TYPE field value of EITINF.

Instruction Processing Aborted Type EIT - aborted EIT (Type=0, PC undefined"

When this EIT occurs, it is detected immediately and EIT processing is started. When this EIT is generated, it is impossible to return to the instruction list which has generated the EIT. RI and SEE fall under this category.

(Instruction Processing Completed Type EIT - completed EIT (Type=1 to 3, PC next instruction)

When this EIT occurs, it is detected after completion of the instruction being executed at that time point and entering into EIT processing. In general, by executing the REIT instruction at the end of the EIT processing handler for the EIT, the instruction next to the one being executed at occurrence of EIT can be executed.

Distinction of Type =1 to 3 is related to priority.

TRAPcc, TRAPA, DBE, DI etc. come under this category.

Instruction Processing Canceled Type EIT - canceled EIT (Type =4, PC present instruction)

When this EIT occurs, the states of the processor and memory are returned to the time point before starting execution of the instruction being processed at occurrence of EIT. In general, by executing the REIT instruction at the end of EIT processing handler for the EIT, the instruction being executed at the occurrence of EIT is reexecuted.

ATRE, BAE, RIE, RFE, PIVE, IOE etc. come under this category.

Types of EIT can be classified as follows.

Type/Stack Format (a) Type 0 EIT (aborted type)
   Reset Interrupt "0/−"
   System Error, "0/−"
(b) Type 1 EIT (completed type)
   Bus Access Trap "1/1"
   Address Translation Trap "1/1"
   Odd Address Jump Trap "1/2"
   Zero Divide Trap "1/2"
   Conditional Trap "1/2"
   Unconditional Trap "1/2"
(c) Type 2 EIT (completed type)
   Self Debug Trap "2/2"
(d) Type 3 EIT (completed type)
   Fixed Vector External Interrupt "3/0"
   Delayed Interrupt "3/0"
   External Interrupt "3/0"
(e) Type 4 EIT
   Bus Access Exception "4/1"
   Address Translation Exception "4/1"
   Privileged Instruction Violation Exception "4/0"
   Ring Translation Violation Exception "4/0"
   Reserved Instruction Exception "4/0"
   Reserved Function Exception "4/0"
   Reserved Stack Format Exception "4/0"
   Illegal Operand Exception "4/0"

The completed type EIT is the one related to the instruction being executed previously, and the canceled type EIT is the one related to the instruction being executed at present. Accordingly, when plural EITs have occurred at the same time, the completed type EIT which is the preceding instruction has to be processed first.

Since the aborted type EIT is very important, when this is detected it is meaningless to process other EITs. Accordingly, when the aborted type and the other type EITs have occurred at the same time, the former must be processed first. As a result, when the plural EITs have occurred, the processing priority is, aborted type>completed type>canceled type, thus, the EITINF TYPE =0 to 4 represents priority of the EIT as it is.

Though some kind and type of EIT are corresponded clearly as RI and TRAP, some are dependent upon implement. Thus, when analyzing the factor of EIT by softwares, the TYPE field is better not to be referred as rewritten as much as possible.

For example, in the case of bus access EIT, it usually becomes TYPE =4 as the Bus Access Exception (BAE) which is the canceled type EIT. However, in the data processor of the present invention in which a store buffer is used for writing memory, when the bus access EIT occurs in the last writing cycle (using the store buffer) of the instruction, there is no contradiction is not reexecuted from the beginning, as far as only the last writing cycle is reexecuted.

Accordingly, in the data processor of the present invention, the bus access EIT in such a case is made the Bus Access Trap (BAT) which is the completed type EIT, and the last write cycle generating an error is processed in the REIT instruction. In this case, BAT is type =1. NEXTPC stacked by the EIT processing is not the BAT generating instruction but the next instruction.

As far as the instruction processing reexecution mode is complied faithfully, when the error has occurred during execution, the EIT of Type =4 is, in principle, started after returning to the state before the execution. However, when the error has occurred at the time point just before completing the instruction, such as implement as starting the EIT of Type=1 on the assumption that the instruction has ended at present, and leaving the remaining processing (write cycle of the store buffer) to the REIT instruction is also possible. In the data processor of the present invention employing this implement method, the types of bus access EIT are two, 1 and 4. In this case, since the necessary processings in the REIT instruction are different responsive to the difference of TYPEs, the REIT instruction must be able to correspond therewith.

In this method, not the whole instruction but only the last write cycle may be reexecuted for the EIT due to the error occurred in the last instruction write cycle. In other words, it is a kind of instruction continuation execution mode. In this case, ERADDR or ERDATA saved on the stack as additional information of the EIT correspond to internal information saved for instruction continuation execution.

In the case of EIT which occurs in the writing cycle using the store buffer, EIT processing is not always entered immediately after the instruction performing the writing.

(3.5) "Stack Format of EIT"

As the EIT is detected, information necessary for EIT processing are saved on the stack. The stack format in this case is as shown in FIG. 13.

Symbols in the format of FIG. 13 designate the following meanings.

PSW: PSW at the time point of detecting EIT.
Format: Stack format No. (8 bits).
Type: EIT Type (8 bits)
Vector: EIT Vector No. (9 bits).
NEXTPC: Execution restart address after returning from the EIT handler.

"Other Information" in FIG. 13 differ responsive to the stack format numbers of each EIT, and information for analyzing the EIT factors and for returning from the EIT handler are included. Stack formats corresponding to the stack format numbers are shown in FIG. 14(a) through FIG. 14(d).

Figures 14A, 14B, 14C, 14D:
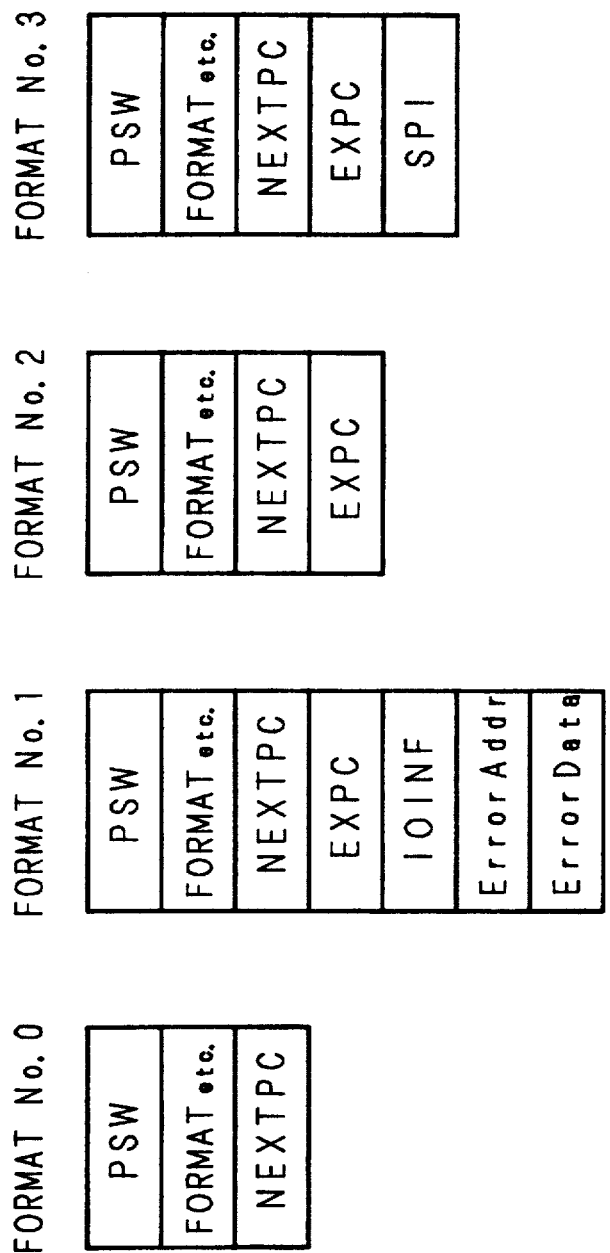
FIG. 14(a) through FIG. 14(d) are schematic views showing its stack format.

FIG. 14(a) shows the format No. 0, (b) shows the format No. 1, (c) shows the format No. 2 and (d) shows the format No. 3. Symbols in the figures designate the following meanings.

| | |
|---|---|
| NEXTPC: | start address of the instruction executed after returning from EIT by the REIT instruction. |
| EXPC: | PC of the instruction being executed at detecting EIT. |
| IOINF: | information related to input/output. |
| Error Addr: | address generating EIT. |
| Error Data: | data generating EIT (effective only on writing, indefinite value comes in on | reading).

SPI: SPI value at EIT detection. Nte: when the word border is crossed, in the high-ranking access (second access), Error Address, Error Data become the address and data of that cycle.

EITs included in respective form at Nos. are as follows.

Format No. 0:
  Reserved Instruction Exception,
  Reserved Function Exception,
  Reserved Stack Format Exception,
  Privileged Instruction Violation Exception,
  Illegal Operand Exception,
  Fixed Vector External Interrupt,
  Delayed Interrupt,
  Delayed Context Trap,
  External Interrupt.

Format No. 1:
  Bus Access Trap,
  Bus Access Exception,
  Address Translation Trap,
  Address Translation Exception (that is, EIT related to memory).

Format No. 2:
  Self Debug Trap,
  Odd Address Jump Trap,
  Zero Divided Trap,
  Conditional Trap,
  Unconditional Trap.

Format No. 3:
  EIt processing for ICE.

EXPC is introduced with the following intention.

Providing Error Analyzing Information

When the EIT of TYPE=1 has occurred at writing of the store buffer, the EXPC is the instruction which requested the writing. The instruction PC under execution has proceeded already.

In the Self Debug Trap, the NEXTPC indicates the next instruction and the EXPC indicates the preceding instruction. Accordingly, for example, when the Self Debug Trap is started at execution of the jump instruction, the PC value before jumping can be known by the EXPC and that after the jumping by the NEXTPC.

Cautions at starting Self Debug Trap by the REIT (RTD) Instruction

In the case of EIT of TRAPA of TYPE=1, EXPC information is not necessary in the processing handler. However, when the EIT of TYPE=1 (TRAPA etc.) and the EIT of Type 2 (Self Debug Trap etc.) occurred simultaneously, the EXPC used in the TYPE=2 must be saved in the EIT of Type =1. It is for this reason that the EXPC is designed to be saved also in TRAPA.

In this case, the EXPC after execution of the REIT instruction for the TRAPA processing should not be the start of REIT instruction, but it must be the returned value of old EXPC popped from the stack. That is, when the Debug Exception being pendent immediately after starting the Debug Trap which was immediately after the REIT instruction is started, the EXPC saved on the stack should not indicate the REIT instruction but the TRAPA instruction. This example is based upon estimation that the Self Debug Trap is masked in the EITVTE of TRAPA.

---

Figure 15:
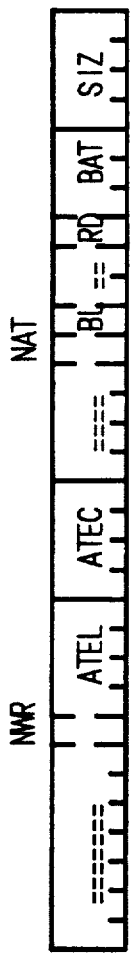
FIG. 15 is a schematic view showing an information format related to its input/output.

A configuration of IOINF is as shown in FIG. 15.
Symbols in FIG. 15 designate the following meanings;
=: reserved to 0.
NWR: having meaning at Appoint Memory Access System EIT (Type = 1) of write retry in the REIT instruction.

NWR = 0: write retry necessary.
NWR = 1: write retry unnecessary.
ATEL: generating location of address translation exception.
  0000: no error
  0001: no error related to access right
  0010 to 1110: (reserved)
  1111: error related I/O area access
ATEC: error codes of errors related to memory access.
  0000: no error
  0001: (reserved)
  0010: (reserved)
  0011: (reserved)
  0100: (reserved)
  0101: access right violation error related to write
  0110: access right violation error related to execute
  0111: (reserved)
  1000: (reserved)
  1001: (reserved)
  1010 to 1100: (reserved)
  1101: memory indirect addressing related to I/O area
  1110: instruction fetch for I/O area
  1111: access crossing I/O area and non I/O area
RD: Bus Cycle Classification.
  RD = 0: write
  RD = 1: read
BL: Bus Lock State
  BL = 0: not under bus lock
  BL = 1: under bus lock
NAT: indication address translation
  NAT = 0: (reserved) ... address translation
  NAT = 1: no address translation
BAT: address types of bus cycle in which EIT has occurred.
  BAT = 000: data
  BAT = 001: program
  BAT = 010: (reserved)
  BAT = 011 to 111 (reserved)
SIZ: data sizes at performing write retry.
  0000: (reserved)
  0001: 1 byte
  0010: 2 bytes
  0011: 3 bytes
  0100: 4 bytes
  0101 to 1111: (reserved)

Even when the address transaction is not performed at AT=00 and AT=10, there is a possibility that EITs related to the memory such as BAE, ATRE etc. occur. Though the stack format is in proportion to the case of AT=01, both the ATEC and ATEL are zero.

In the data processor of the present invention, for realizing EIT processings as aforementioned in the various timings processings a numbers of high function instruction, it is so controlled that only the writing processing in the last step of the microprogram is shifted to a store buffer for processing.

For example, when transferring very long data by the SMOV (String MOVE) instruction, since the data processor of the present invention comprises a 32-bit data pin, one instruction performs external bus access for plural times. In that case, when an error is generated in the external bus access during execution, since the error is generated before completing the instruction, the processing is Reexecution type Exception. Also, the external bus access processing which generated the error then is not completed properly, so that as an internal state of a microprocessor, the state before the processing must be brought to the state after returning to the EIT processing. Accordingly, when there is a possibility that the reexecution type Bus Access Exception occurs at processing, before starting the execution stage next, it is necessary to wait until the writing processing is completed properly or to preserve internal state information. When the writing processing has moved to the next pipeline stage, aforesaid control will become very complicated.

That is, the internal state must be presented in a buffer memory unit, for this reason a large number of hardwares are necessitated. In the data processor of the present invention, the writing processing as mentioned above does not move to the next pipeline stage and controls in the execution stage. That is, the instruction stage is not moved to the next processing until the writing processing is completed. Furthermore, since only the last step writing processing is restricted to move to the next pipeline stage, control is very simple. By effecting writing processings other than the last step as the execution stage processing, the processings may not be effected in parallel, but, in fact, such processings are effected in the high function instruction, so that a delay in processing speed can be suppressed by optimizing the microprogram.

A detailed pipeline flow of one embodiment of the data processor of the present invention is shown in FIG. 16.

As previously stated, the data processor of the present invention comprises five pipeline stages, the instruction fetch stage 1, instruction decode stage (1)3 and (2)9, operand address calculation stage 5, operand fetch stage 6 and micro ROM access stage 11. Buffers storing step codes, specifically, an instruction queue 2, A code queue 5, S code queue 7, D code queue 8 and R code queue 10, are provided between some of the pipeline stages for uniforming the pipeline load. A store buffer 13 is designed to operate only for writing processing using the external bus of the last microstep, under control of an instruction execution unit 12.

Figure 17:
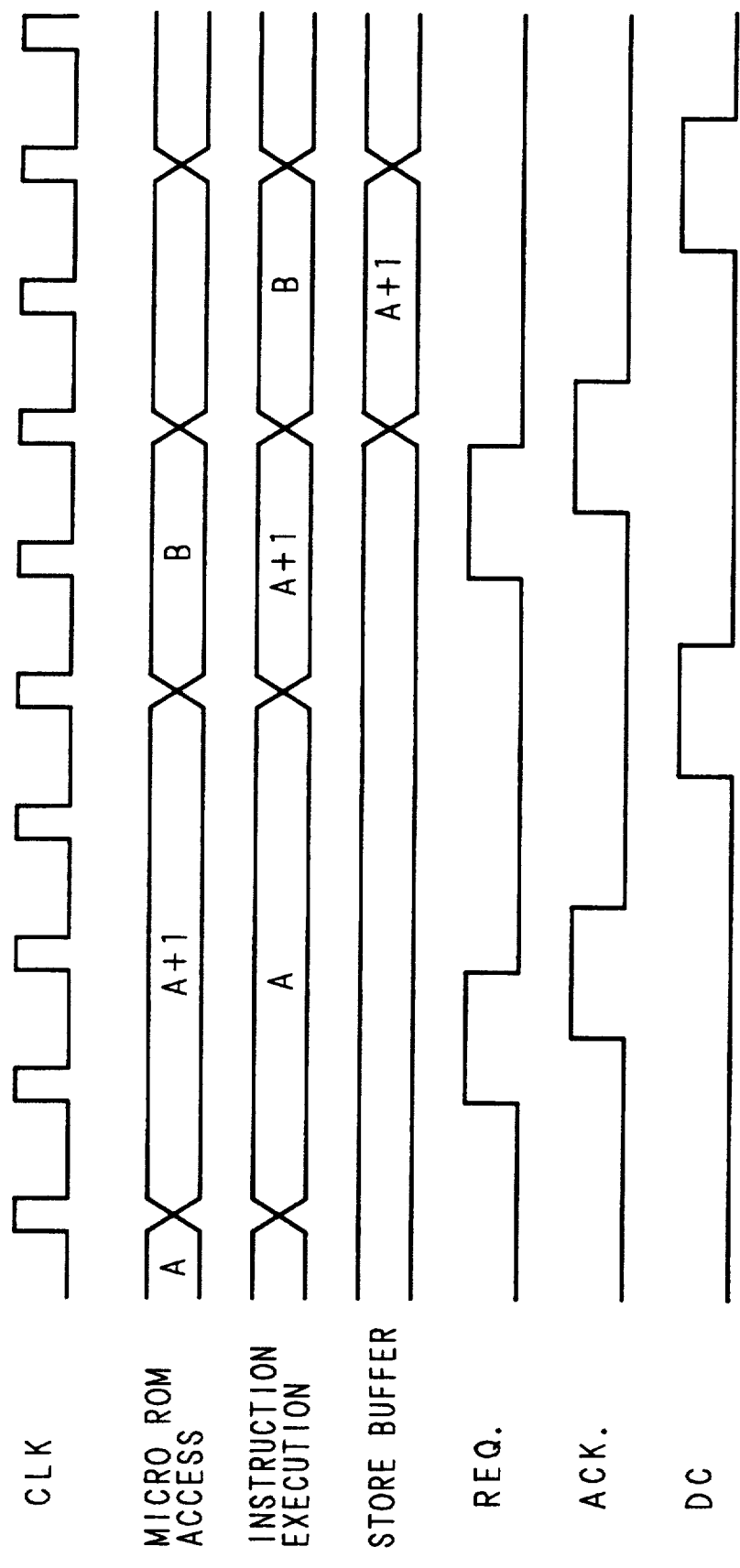
FIG. 17 is timing charts comparing the states in the cases wherein a store buffer is used and not used.

Timing charts when using the store buffer 13 are shown in FIG. 17.

Processings (A) and (A+1) are a series of microprogrammed processings, both including writing processings taking with the external bus access. Here, only the processing (A+1) uses the store buffer at writing processing. That is, one pipeline stage is added and processed. Accordingly, in the case of processing (A), though the instruction execution stage does not move to the next processing until the writing processing is completed, in the case of processing (A+I), it is possible to move to the next processing immediately when a bus access right is obtained.

Figure 18:
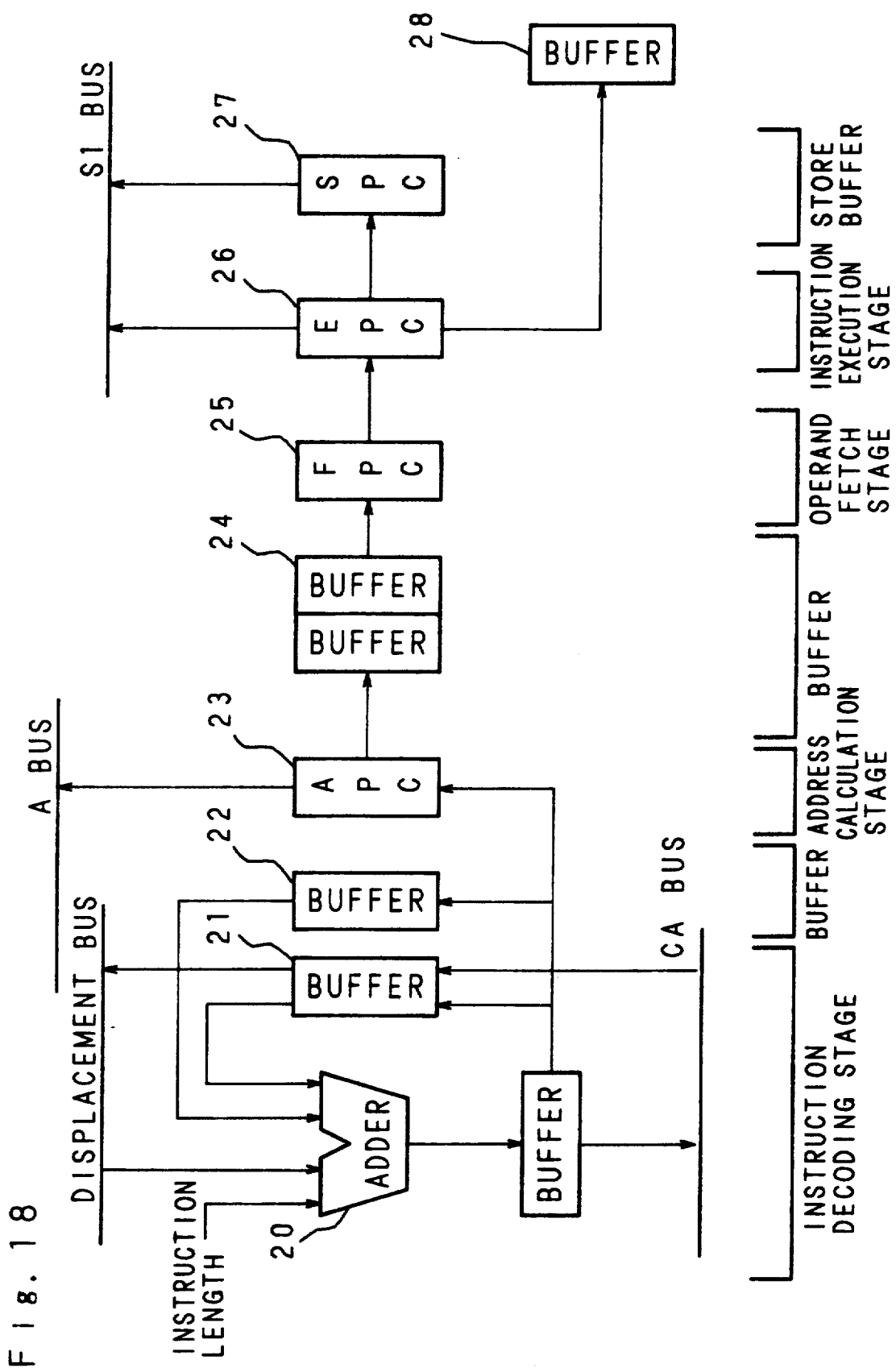
FIG. 18 is a block diagram showing the configuration for PC control.

A configuration for managing PC which is one of internal state information of the data processor of the present invention is shown in FIG. 18.

The PC is first calculated in a PC calculating unit which is hardwired controlled by information related to PC calculation outputted from the instruction decoding stage. The instruction length outputted from the instruction decoding state is added to a PC value of the instruction being decoded to generate the PC value of the next instruction. When the branch instruction is decoded, a branch displacement (DISP) is added in place of the instruction length. These additions are executed by a PC adder 20.

The generated PC value is stored in buffers 21, 22 through a buffer and is sent to an APC 32 in the address calculation stage for the next PC calculation. Thereafter, the generated PC value sent to a buffer 24, FPC 25, EPC 26 and SPC 27 in order and finally to a buffer 28.

In such a manner, each of the pipeline stages retains internal stage information respectively, and at completion of the processing, the internal state information is sent successively to the next pipeline stage together with the step code resulted from processing.

In the data processor of the present invention, as shown in FIG. 16, since some buffers are provided between the pipeline stages, the instruction which can be fetched internally in stages after the D stage are a maximum of eight. Thus, the number of instructions which can be fetched must be prepared as PC. The SPC 27 is provided also for the store buffer, and the writing processing taking with the external bus access of the last microstep is transferred to this register, when the bus right is obtained.

Also for writing processing taking with the external bus access other than the last microprogram step processing which do not influence internal state information such as PSW during the writing processing can be executed, so that parallel processings can be executed by judging the processing content by the microprogram. This processing is not the pipeline processing but the parallel processing of the instructions. In the data processor of the present invention, it is judged whether the writing processing and the other processing can be executed in parallel in the microprogram and information which indicates to wait completion of the writing processing is generated.

Figure 19:
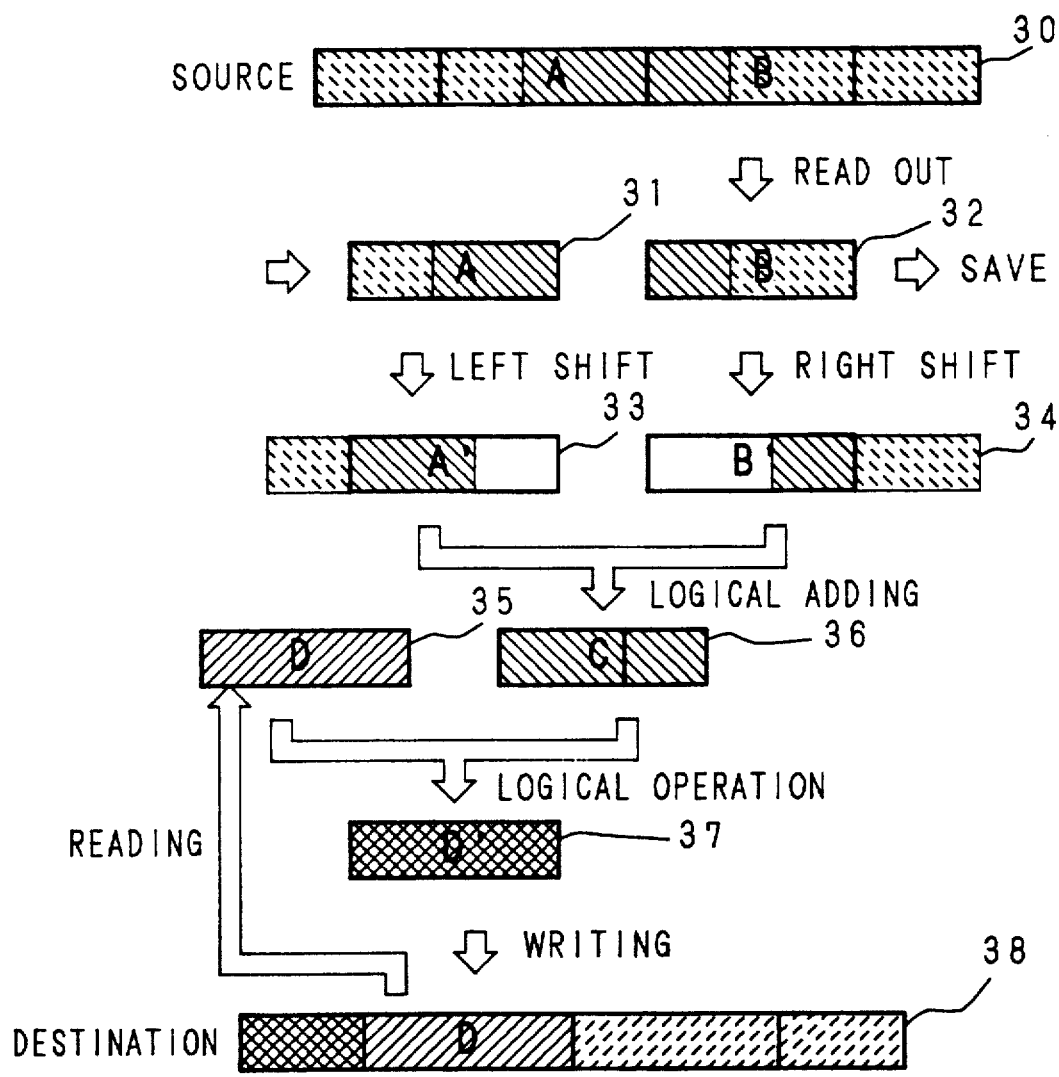
FIG. 19 is a schematic view showing an outline of BVMAP instruction processing.

A method of processing the BVMAP instruction in the data processor of the present invention is shown in FIG. 19 and FIG. 20.

The BVMAP instruction is a variable length bit operation instruction, whose content is explained with reference to FIG. 19. In addition, this BVMAP instruction is for storing arbitrary bit length data in a destination address from optional bit position of a source operand 30 with performing logical operation, and very effective as the bit map display processing instruction.

Processing procedures of the instruction are, first dividing the source operand into word borders, since the internal microprocessor processing are, basically, all performed in a word (32 bits in the embodiment) unit. And for a bit field crossing the two words, A and B, the bit position is shifted and corrected for each word so as to enable internal processings (33, 34)

Next, word data C subject to the internal processings is generated by the logical sum of two corrected words (36). Then, after the logical operation (37) with data D (35), stored in the destination address.

A flow in which these processings are executed by the microprogram is shown in FIG. 20.

The BVMAP instruction can be, basically, divided into five types from the viewpoint of microinstruction. Those are, left shift and reading of source operand, right shift and data saving, logical operation (logical sum) and reading of destination operand, logical operation, and writing into destination address.

Among these, left shift, right shift and logical sum operation are not followed by the operation of internal information such as PSW. Accordingly, these processings can be processed in parallel with the writing processing accompanied by the external bus access. As such, in the data processor of the present invention, hardwares realizing the EIT processings can be reduced, and deterioration of the performance can be suppressed by optimizing the microprogram.

As particularly described heretofore, by transferring only the writing processing taking with the external bus access processing in the last step of the microprogram and adding one more pipeline stage, information showing the internal state of a microprocessor can be managed very easily, and EIT processings may be coped with a simple hardware configuration. Also, by restricting to the last step of the microprogram, an extra microinstruction for operating the store buffer is not necessary.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A pipelined data processor for executing a processor instruction in parallel, comprising:
   a plurality of microprograms, each comprising at least one microinstruction and implementing a processor instruction, said microprograms including memory store microinstructions;
   a microprogram memory for storing said plurality of microprograms, said microprogram memory comprising addressable memory locations, wherein a first instruction of each of said plurality of microprograms is located at a microprogram entry location within said microprogram memory, and said microprogram memory outputting at a data output a microinstruction stored at a memory location indicated by an address input on an address bus;
   a microprogram counter, coupled to said address bus of said microprogram memory, for stepping through said microprogram memory locations starting with an initial value loaded into said microprogram counter and ending with a microprogram ending microinstruction;
   an instruction decoding stage, coupled to an input of the pipelined data processor and to said microprogram counter, said instruction decoding stage comprising means for accepting a processor instruction, means for decoding said processor instruction, means for generating a microprogram entry address, and means for loading said microprogram entry location entry address as said initial value in said microprogram counter;
   an instruction execution stage, coupled to said instruction decoding stage and said data output of said microprogram memory, for executing each microinstruction output at said data output;
   a store buffer, coupled to said instruction execution stage, configured to hold a storing address and data to be stored at said storing address in response to a memory store microinstruction, said storing address pointing to a memory location in an external memory; and
   a store selection means, coupled to said instruction execution stage, said store buffer, and said external memory, for writing said data to be stored to external memory using one data path of a direct path and a buffered path, said direct path characterized by a path which transfers said data to be stored from said instruction execution stage to said external memory, said direct path including means for preventing said instruction execution stage from processing a new microinstruction until said transfer to said external memory is completed, and said buffered path characterized by a path which transfers said data to be stored and said storing address to said store buffer, said store selection means transferring said data along said direct path when said microinstruction is not a microprogram ending microinstruction and transferring said data along said buffered path when said microinstruction is a microprogram ending microinstruction, wherein said data in said store buffer is used when an exception, interrupt, or trap (EIT) occurs to guarantee completion of said processor instruction when EIT processing begins.

2. A pipelined data processor for executing processor instructions in parallel, comprising:
   a microprogram memory for storing a plurality of microprograms each comprising at least one microinstruction, wherein each microprogram implements one of the processor instructions, and wherein at least one of the processor instructions is implemented with more than two microinstructions;
   an instruction decoding stage, coupled to an input of the pipelined data processor, for accepting a processor instruction, for decoding said processor instruction, and for generating a microprogram entry address for said processor instruction being decoded, wherein said microprogram entry address indicates a beginning of a microprogram which implements said processor instruction being decoded;
   an instruction execution stage, coupled to said instruction decoding stage and said microprogram memory, comprising a plurality of functional units, wherein said instruction execution stage executes microinstructions of a microprogram indicated by said instruction decoding stage, starting at said beginning of said microprogram, wherein more than one functional unit processes said microinstructions of said microprogram, and wherein said microprogram includes a last microinstruction as a final step of processing a microprogram;
   a store buffer, coupled to said instruction execution stage, wherein said store buffer holds a storing address and data to be stored at said storing address in response to a memory microinstruction; and
   an external memory, coupled to said instruction execution stage and said store buffer, wherein said storing address points to a memory location in said external memory, wherein said instruction execution stage writes said storing address and said data to be stored to said store buffer when said memory microinstruction is said last microinstruction, wherein said store buffer pauses said instruction execution stage until a said data to be stored is stored at said storing address in said external memory when said microinstruction is said last microinstruction, and wherein said store buffer does not prevent said instruction execution stage from executing a next microprogram when said microinstruction is not said last microinstruction, wherein said data in said store buffer is used when an exception, interrupt, or trap (EIT) occurs to guarantee completion of said processor instruction when EIT processing begins.

3. A method for executing, in a pipelined data processor, processor instructions in parallel, comprising the steps of:

storing a plurality of microprograms each comprising at least one microinstruction in a microprogram memory;

accepting a processor instruction;

decoding said processor instruction;

generating a microprogram entry address for said decoded processor instruction, said microprogram entry address indicating a beginning of a microprogram in said microprogram memory which implements said decoded processor instruction;

executing microinstructions of a microprogram indicated by said microprogram entry address generated in the generating step, said instructions being executed in a pipeline, wherein more than one functional unit processes said microinstructions of said microprogram;

selecting one data path of a direct path and a buffer path for writing data to be stored to an external memory using said selected one path when an exception, interrupt, or trap (EIT) occurs to guarantee completion of said processor instruction when EIT processing begins, said buffered path selected when said memory microinstruction is a last microinstruction of a microprogram and a memory store microinstruction, and said direct path selected otherwise;

loading, when said buffered path is selected, a storing address and data to be stored at said storing address to a store buffer; and loading, when said direct path is selected, said data to be stored into said external memory.

* * * * *